United States Patent
Yang et al.

(10) Patent No.: US 10,615,946 B2
(45) Date of Patent: Apr. 7, 2020

(54) METHOD AND APPARATUS FOR TRANSMITTING CONTROL INFORMATION IN WIRELESS COMMUNICATION SYSTEM

(71) Applicant: LG Electronics Inc., Seoul (KR)

(72) Inventors: Suckchel Yang, Seoul (KR); Hanbyul Seo, Seoul (KR); Joonkui Ahn, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 474 days.

(21) Appl. No.: 15/305,138

(22) PCT Filed: May 7, 2015

(86) PCT No.: PCT/KR2015/004538
§ 371 (c)(1),
(2) Date: Oct. 19, 2016

(87) PCT Pub. No.: WO2015/170885
PCT Pub. Date: Nov. 12, 2015

(65) Prior Publication Data
US 2017/0041123 A1    Feb. 9, 2017

Related U.S. Application Data

(60) Provisional application No. 61/989,540, filed on May 7, 2014.

(51) Int. Cl.
*H04L 1/18* (2006.01)
*H04L 5/14* (2006.01)
(Continued)

(52) U.S. Cl.
CPC .............. *H04L 5/14* (2013.01); *H04L 1/1812* (2013.01); *H04L 1/1861* (2013.01); *H04L 5/001* (2013.01);
(Continued)

(58) Field of Classification Search
CPC ...... H04J 11/00; H04L 1/1812; H04L 1/1861; H04L 5/14; H04W 72/0406; H04W 72/0446
(Continued)

(56) References Cited

U.S. PATENT DOCUMENTS

2011/0103291 A1 * 5/2011 Wiberg .............. H04B 7/15542
                                                370/315
2012/0257552 A1    10/2012 Chen et al.
(Continued)

FOREIGN PATENT DOCUMENTS

KR    1020130032862 A    4/2013

OTHER PUBLICATIONS

LG Electronics: "Summary of email discussion on DL HARQ timing for TDD-FDD carrier aggregation with self-carrier scheduling", 3GPP TSG RAN WG1 Meeting #76, R1-140315, Feb. 10-14, 2014.

(Continued)

*Primary Examiner* — Melvin C Marcelo
*Assistant Examiner* — Natali Pascual Peguero
(74) *Attorney, Agent, or Firm* — Dentons US LLP

(57) ABSTRACT

The present invention relates to a wireless communication system. The present invention more particularly relates to a method for transmitting control information in an FDD cell by a device, and an apparatus for same, the method comprising the steps of: receiving SF reconfiguration information about a UL CC; receiving on the FDD cell a PDCCH comprising DCI; receiving on the FDD cell a PDSCH indicated by means of the PDCCH; and transmitting, on the UL CC, HARQ-ACK information about the PDSCH, wherein if the PDSCH has been received on the DL CC, the (Continued)

DCI does not comprise a DAI field and if the PDSCH has been received on the UL CC, the DCI comprises the DAI field.

10 Claims, 16 Drawing Sheets

(51) Int. Cl.
*H04W 72/04* (2009.01)
*H04L 5/00* (2006.01)

(52) U.S. Cl.
CPC .......... *H04L 5/0055* (2013.01); *H04L 5/0092* (2013.01); *H04L 5/143* (2013.01); *H04W 72/0406* (2013.01); *H04W 72/0446* (2013.01)

(58) Field of Classification Search
USPC ................................. 370/277, 280, 281, 329
See application file for complete search history.

(56) References Cited

U.S. PATENT DOCUMENTS

| | | | |
|---|---|---|---|
| 2013/0010709 A1* | 1/2013 | Earnshaw | H04L 5/001 370/329 |
| 2013/0194931 A1* | 8/2013 | Lee | H04L 5/0053 370/241 |
| 2013/0223300 A1 | 8/2013 | Yang et al. | |
| 2013/0242881 A1* | 9/2013 | Wang | H04L 1/18 370/329 |
| 2013/0265948 A1* | 10/2013 | Lee | H04L 1/1861 370/329 |
| 2015/0117275 A1* | 4/2015 | Park | H04L 1/1812 370/280 |
| 2017/0105198 A1* | 4/2017 | Fu | H04L 1/1822 |

OTHER PUBLICATIONS

NTT DoCoMo: "Design of HARQ feedback for TDD-FDD CA", 3GPP TSG RAN WG1 Meeting #76, R1-140618, Feb. 10-14, 2014.

* cited by examiner

METHOD AND APPARATUS FOR TRANSMITTING CONTROL INFORMATION IN WIRELESS COMMUNICATION SYSTEM

This application is a 35 USC § 371 National Stage entry of International Application No. PCT/KR2015/004538 filed on May 7, 2015, and claims priority to U.S. Provisional Application No. 61/989,540 filed on May 7, 2014, all of which are hereby incorporated by reference in their entireties as if fully set forth herein.

TECHNICAL FIELD

The present invention relates to a wireless communication system and, more particularly, to a method for transmitting control information in a wireless communication system and an apparatus for the same.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Task

An object of the present invention is to provide a method of efficiently transmitting/receiving control information in a wireless communication and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting control information, which is transmitted by a user equipment in a wireless communication system via a FDD cell including a UL CC (uplink component carrier) and a DL CC (downlink component carrier), includes the steps of receiving SF (subframe) reconfiguration information on the UL CC, wherein the SF reconfiguration information indicates an SF pattern which is repeated in a unit of 8 SFs, receiving PDCCH (physical downlink control channel) including DCI (downlink control information) on the FDD cell, receiving PDSCH (physical downlink shared channel) indicated by the PDCCH on the FDD cell, and transmitting HARQ-ACK (hybrid automatic repeat request acknowledgement) information on the UL CC in response to the PDSCH. In this case, if the PDSCH is received on the DL CC, the DCI does not include a DAI (downlink assignment index) field and if the PDSCH is received on the UL CC, the DCI includes the DAI field.

To further achieve these and other advantages and in accordance with the purpose of the present invention, according to a different embodiment, a user equipment configured to transmit control information via a FDD cell including a UL CC (uplink component carrier) and a DL CC (downlink component carrier) in a wireless communication system includes an RF (radio frequency) unit and a processor, the processor configured to receive SF (subframe) reconfiguration information on the UL CC, wherein the SF reconfiguration information indicates an SF pattern which is repeated in a unit of 8 SFs, the processor configured to receive PDCCH (physical downlink control channel) including DCI (downlink control information) on the FDD cell, the processor configured to receive PDSCH (physical downlink shared channel) indicated by the PDCCH on the FDD cell, the processor configured to transmit HARQ-ACK (hybrid automatic repeat request acknowledgement) information on the UL CC in response to the PDSCH. In this case, if the PDSCH is received on the DL CC, the DCI does not include a DAI (downlink assignment index) field and if the PDSCH is received on the UL CC, the DCI includes the DAI field.

Preferably, if the PDSCH is received on the DL CC, the DCI includes a 3-bit HARQ process number field and if the PDSCH is received on the UL CC, the DCI can include a 4-bit HARQ process number field.

Preferably, if the PDSCH is received on the DL CC, the DCI is received via a CSS (common search space) or a USS (UE-specific SS) and if the PDSCH is received on the UL CC, the DCI can be received via the USS only.

Preferably, the SF reconfiguration information on the UL CC indicates UL-DL configuration and SF configuration of the UL CC can be assigned as follows according to the UL-DL configuration.

| UL-DL configuration | Subframe number | | | | | | | |
|---|---|---|---|---|---|---|---|---|
| | 0 | 1 | 2 | 3 | 4 | 5 | 6 | 7 |
| 1-1 | U | D | D | D | D | D | D | S |
| 2-1 | U | U | D | D | D | D | D | S |
| 2-2 | U | D | D | S | U | D | D | S |
| 3-1 | U | U | U | D | D | D | D | S |
| 3-2 | U | D | S | U | D | S | U | S |
| 3-3 | U | U | D | S | U | D | D | S |
| 3-4 | U | U | D | D | S | U | D | S |
| 4-1 | U | U | U | U | D | D | D | S |
| 4-2 | U | S | U | S | U | S | U | S |
| 4-3 | U | U | D | S | U | U | D | S |

Preferably, if the PDSCH is received on the UL CC, a timing relationship between the PDSCH and the HARQ-ACK follows a timing relationship of UL-DL configuration #1-1, #2-1, or #2-2 and a timing relationship according to the UL-DL configuration can be given as follows:

| UL-DL configuration | Subframe number | | | | | | | |
|---|---|---|---|---|---|---|---|---|
| | 0 | 1 | 2 | 3 | 4 | 5 | 6 | 7 |
| 1-1 | 4/5/6/7/9/10/11 | — | — | — | — | — | — | — |
| 2-1 | 4/6/10 | 4/6/10 | — | — | — | — | — | — |
| 2-2 | 5/6/7 | — | — | — | 5/6/7 | — | — | — |

In this case, SF n corresponds to an SF in which the HARQ-ACK information is transmitted, an SF n−k corresponds to an SF in which the PDSCH is received, and k corresponds to a value belonging to the table.

Advantageous Effects

According to the present invention, control information can be efficiently transmitted and received in a wireless communication system. And, a control channel signal can be efficiently transmitted and received.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Mode for Invention

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

In a wireless communication system, a user equipment (UE) receives information from a base station (BS) on downlink (DL) and transmits information to the BS on uplink (UL). In LTE(-A), DL transmission is performed using OFDMA and uplink transmission is performed using single carrier frequency division multiple access (SC-FDMA).

Figure 1:
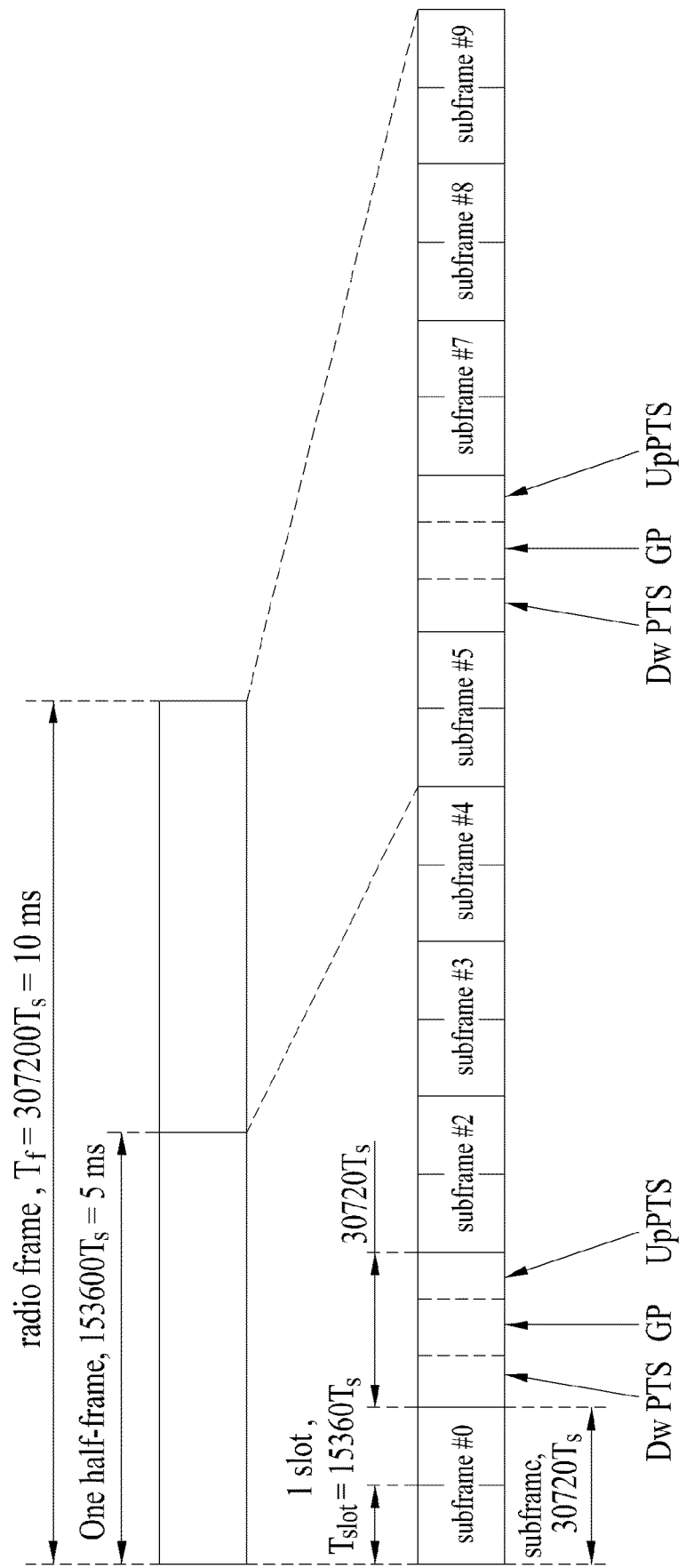
FIG. 1 illustrates a radio frame structure.

FIG. 1 illustrates a radio frame structure.

FIG. 1(a) illustrates a type-1 radio frame structure for frequency division duplex (FDD). A radio frame includes a plurality of (e.g. 10) subframes each of which includes a plurality of (e.g. 2) slots in the time domain. Each subframe has a duration of 1 ms and each slot has a duration of 0.5 ms. A slot includes a plurality of OFDM/SC-FDMA symbols in the time domain and includes a plurality of resource blocks (RBs) in the frequency domain.

FIG. 1(b) illustrates a type-2 radio frame structure for time division duplex (TDD). The type-2 radio frame includes 2 half frames. Each half frame includes 5 subframes each of which includes 2 slots.

Table 1 shows UL-DL configurations (Uplink-Downlink Configuration, UL-DL Cfg or UD-cfg) of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Figure 2:
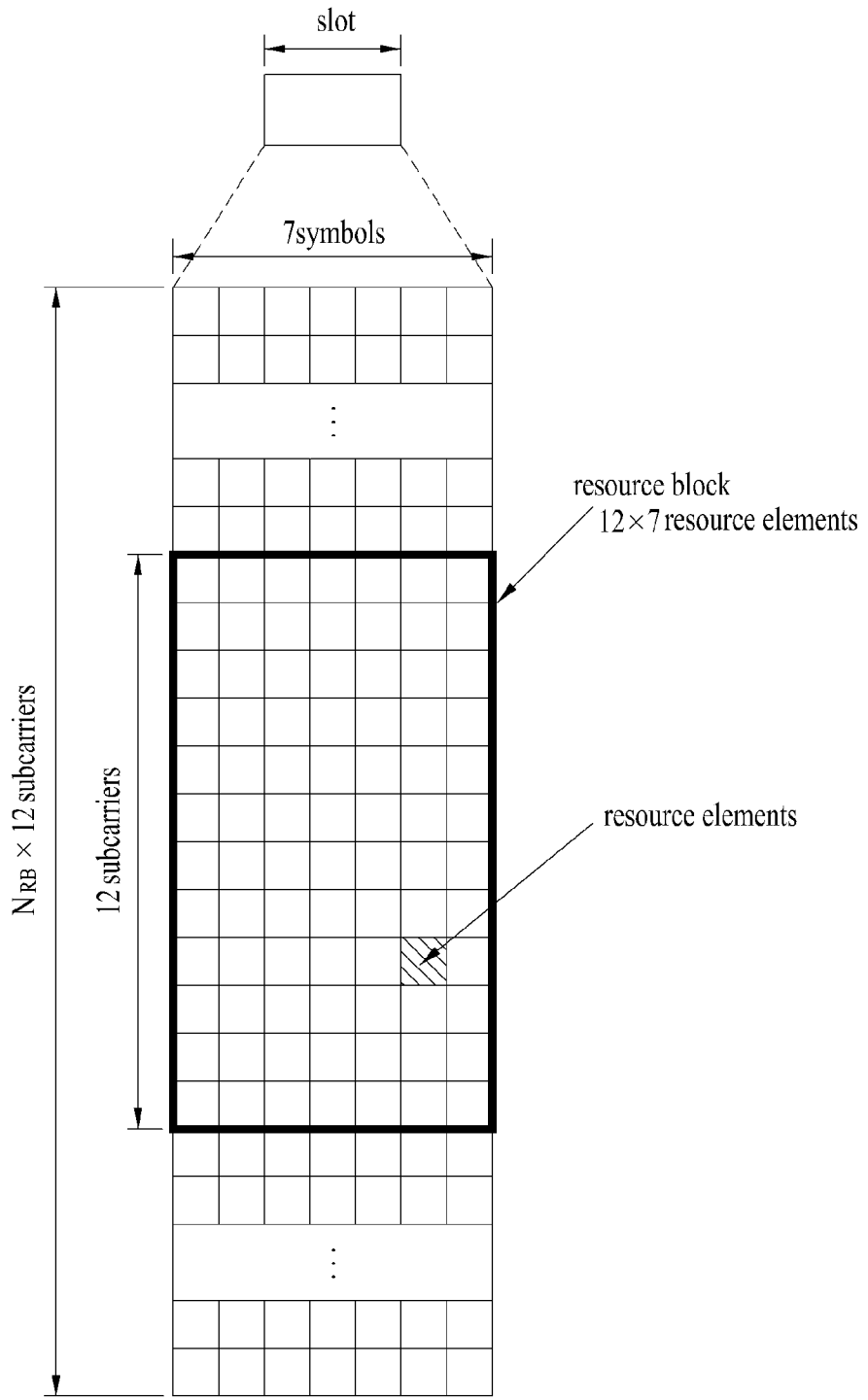
FIG. 2 illustrates a resource grid of a downlink slot.

FIG. 2 illustrates a resource grid of a DL slot.

Referring to FIG. 2, a DL slot includes a plurality of OFDMA (or OFDM) symbols in the time domain. One DL slot may include 7(6) OFDMA symbols according to cyclic prefix (CP) length, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of a UL slot may be same as that of the DL slot except that OFDMA symbols by replaced by SC-FDMA symbols.

Figure 3:
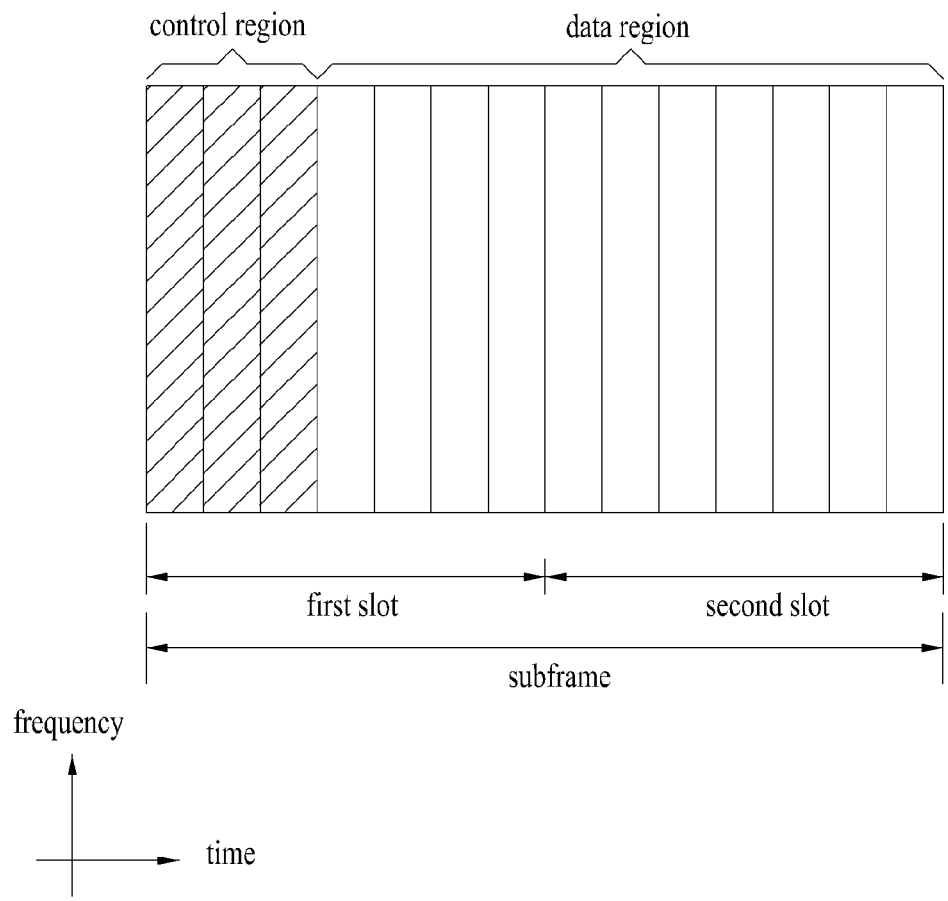
FIG. 3 illustrates a downlink subframe structure.

FIG. 3 illustrates a DL subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of DL control channels include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ-ACK signal.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. Downlink control information (DCI) is transmitted through the PDCCH. DCI formats 0/4 (referred to as UL DCI formats hereinafter) for UL scheduling (or UL grant (UG)) and DCI formats 1/1A/1B/1C/1D/2/2A/2B/2C/2D (referred to as DL DCI formats) DL scheduling are defined. The DCI formats selectively include information such as hopping flag, RB allocation, MCS (Modulation Coding Scheme), RV (Redundancy Version), NDI (New Data Indicator), TPC (Transmit Power Control), DMRS (Demodulation Reference Signal) cyclic shift, etc. as necessary.

A plurality of PDCCHs can be transmitted within a control region. A UE monitors the plurality of PDCCHs per subframe in order to check a PDCCH destined therefor. The PDCCH is transmitted through one or more control channel elements (CCEs). A PDCCH coding rate may be controlled by the number of CCEs (i.e. CCE aggregation level) used for PDCCH transmission. A CCE includes a plurality of resource element groups (REGs). A format of the PDCCH and the number of PDCCH bits are determined by the number of CCEs. A BS determines a PDCCH format according to DCI to be transmitted to the UE, and attaches a cyclic redundancy check (CRC) to control information. The CRC is masked with an identifier (e.g. a radio network temporary identifier (RNTI)) according to an owner or usage of the PDCCH. If the PDCCH is for a specific UE, then an identifier (e.g., cell-RNTI (C-RNTI)) of the UE may be masked to the CRC. If the PDCCH is for a paging message, then a paging identifier (e.g., paging-RNTI (P-RNTI)) may be masked to the CRC. If the PDCCH is for system information (more specifically, a system information block (SIB)), then a system information RNTI (SI-RNTI) may be masked to the CRC. When the PDCCH is for a random access response, then a random access-RNTI (RA-RNTI) may be masked to the CRC.

The PDCCH carries a message known as DCI, and a plurality of PDCCHs are generally transmitted at a subframe. Each PDCCH is transmitted using one or more control channel elements (CCEs), each of which corresponds to nine REGs. One REG corresponds to four resource elements (REs). Four QPSK symbols are mapped into each REG. A resource element (RE) reserved by the reference signal (RS) is not included in the REG. Therefore, a total number of REGs within given OFDM symbols are varied depending on the presence of a cell-specific reference signal. The REG concept is also used for other downlink control channels (that is, PDFICH and PHICH). Four PDCCH formats are supported as listed in Table 2.

TABLE 2

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are used by being numbered continuously. In order to simplify a decoding process, the PDCCH having a format that includes n number of CCEs may start from only CCE having a number equivalent to a multiple of n. The number of CCEs used for transmission of a specific PDCCH is determined by the BS in accordance with a channel state. For example, if the PDCCH is for a UE having a good downlink channel (for example, adjacent to BS), one CCE may be required. However, in case of a UE having a poor channel (for example, adjacent to the cell edge), eight CCEs may be required to obtain sufficient robustness. Also, a power level of the PDCCH may be adjusted to correspond to the channel state.

The LTE system defines a set of CCEs, where the PDCCH may be located for each UE. The set of CCEs, where the UE may discover its PDCCH, may be referred to as a search space (SS). Individual resources within the search space, to which the PDCCH may be transmitted, will be referred to as PDCCH candidates. One PDCCH candidate corresponds to 1, 2, 4, or 8 CCEs depending on a CCE aggregation level. The BS transmits actual PDCCH (DCI) onto a random PDCCH candidate within the search space, and the UE monitors the search space to discover PDCCH (DCI). In more detail, the UE tries blind decoding (BD) for the PDCCH candidates within the search space.

In the LTE, the search space for each PDCCH format may have different sizes. A dedicated SS (or UE-specific SS, USS) and a common search space are defined. The USS is configured separately for each UE, and the range of the CSS is notified to all UEs. The USS and the CSS may be overlapped for the given UE.

Since the search spaces (SSs) may be configured in small size and may overlap each other, it may be impossible for the BS to search for CCE resources for transmitting a PDCCH to all desired UEs within a given subframe. That is, since CCE resources have already been allocated to other UEs, CCE resources for a specific UE may no longer be present in a search space of the specific UE (blocking). In order to minimize the possibility of blocking to be sustained at the next subframe, a UE-specific hopping sequence is applied to the start position of the dedicated search space. Table 3 illustrates sizes of the common and dedicated search spaces.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

Figure 4:
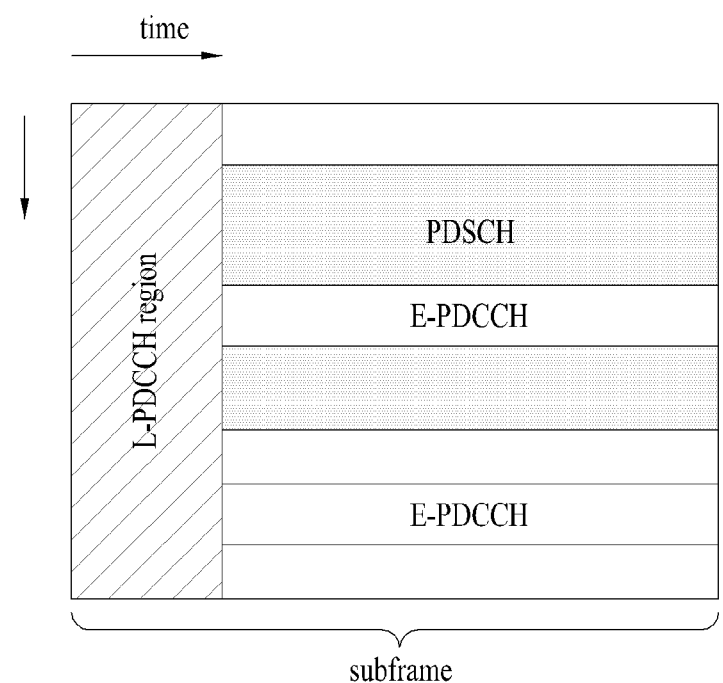
FIG. 4 illustrates an example of Enhanced Physical Downlink Control Channel (EPDCCH)

FIG. 4 illustrates an EPDCCH. The EPDCCH is a channel additionally introduced in LTE-A.

Referring to FIG. 4, a PDCCH (for convenience, legacy PDCCH or L-PDCCH) according to legacy LTE/LTE-A may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 5:
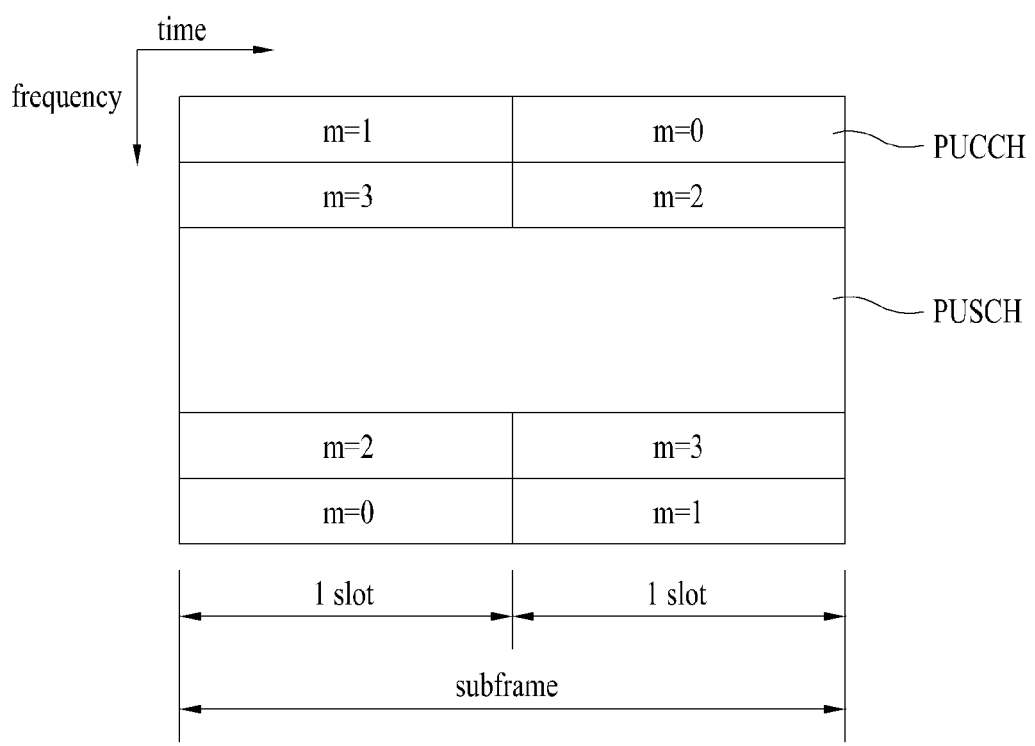
FIG. 5 illustrates the structure of an uplink subframe.

FIG. 5 illustrates a UL subframe structure.

Referring to FIG. 5, a UL subframe includes a plurality of (e.g. 2) slots. A slot may include different numbers of SC-FDMA symbols according to CP lengths. The UL subframe is divided into a control region and a data region in the frequency domain. The data region is used to carry a data signal such as audio data through a physical uplink shared channel (PUSCH). The control region is used to carry uplink control information (UCI) through a physical uplink control channel (PUCCH). The PUCCH includes an RB pair located at both ends of the data region in the frequency domain and hopped in a slot boundary.

The PUCCH can be used to transmit the following control information.

SR (scheduling request): This is information used to request a UL-SCH resource and is transmitted using On-Off Keying (OOK) scheme.

HARQ-ACK: This is an acknowledgement signal for a DL signal (e.g. a PDSCH or SPS release PDCCH). For example, a 1-bit ACK/NACK signal is transmitted as a response to a single DL codeword and a 2-bit ACK/NACK signal is transmitted as a response to two DL codewords.

CSI (channel state information): This is feedback information about a DL channel. The CSI includes a CQI (channel quality indicator), RI (rank indicator), PMI (precoding matrix indicator), PTI (precoding type indicator), etc.

Table 4 shows the mapping relationship between PUCCH formats and UCI in LTE(-A).

TABLE 4

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CSI (20 coded bits) |
| Format 2 | CSI and 1- or 2-bit HARQ ACK/NACK (20 bits) (corresponding to only extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 coded bits) |

Figure 6:
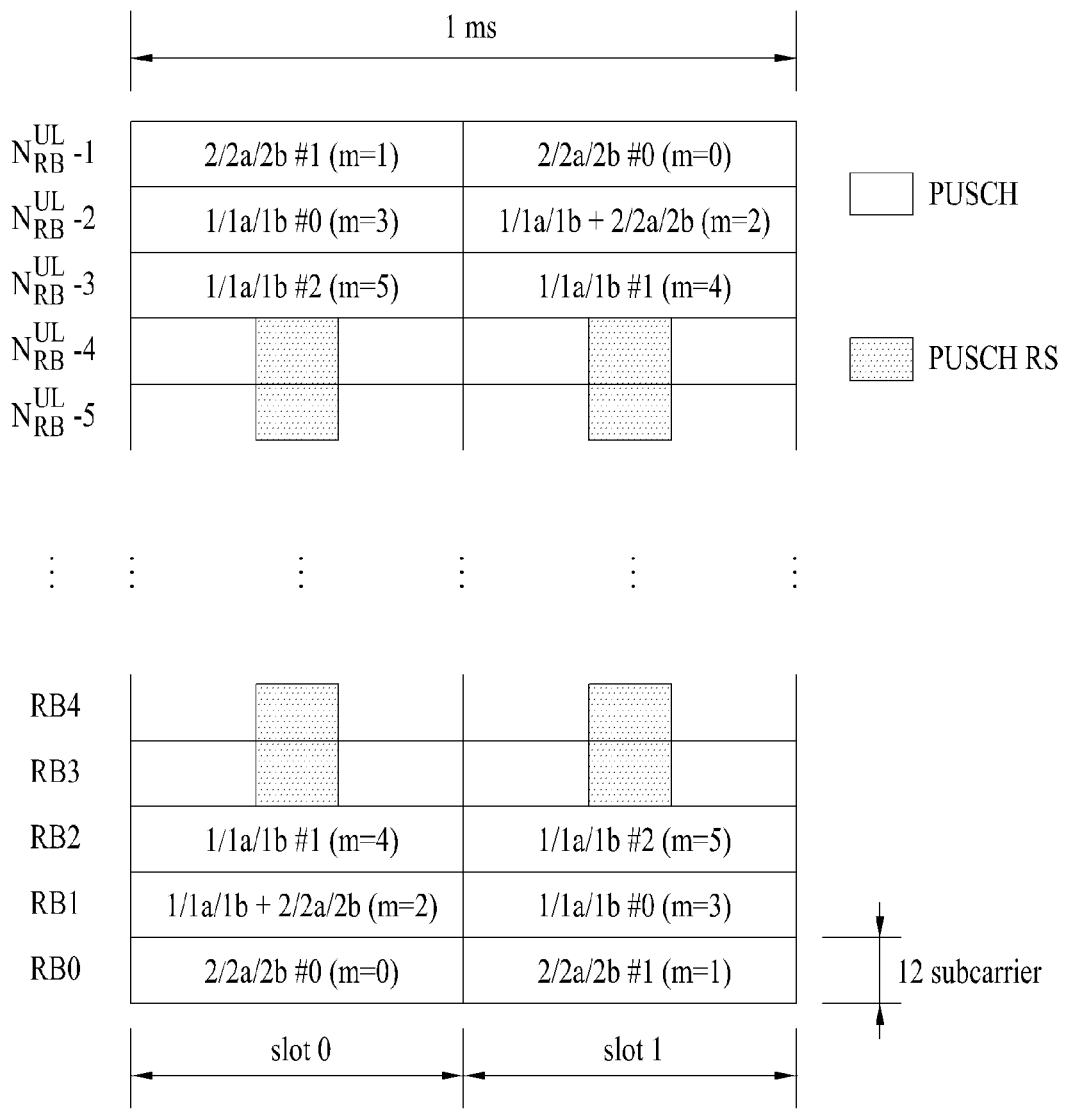
FIG. 6 illustrates an example of physically mapping a PUCCH format to a PUCCH region.

FIG. 6 illustrates an example of physically mapping PUCCH formats to PUCCH regions.

Referring to FIG. 6, the PUCCH formats are mapped to RBs in the order of PUCCH formats 2/2a/2b (CQI) (e.g. PUCCH region m=0, 1), PUCCH formats 2/2a/2b (CQI) or PUCCH formats 1/1a/1b (SR/HARQ ACK/NACK) (e.g. PUCCH region m=2 if present) and PUCCH formats 1/1a/1b (SR/HARQ ACK/NAKC) (e.g. PUCCH region m=3, 4, 5) from the band edge to the inside and transmitted. The number $N_{RB}^{(2)}$ of PUCCH RBs that can be used for PUCCH format 2/2a/2b (CQI) is signaled to the UE through broadcast signaling in the cell.

Figure 7:
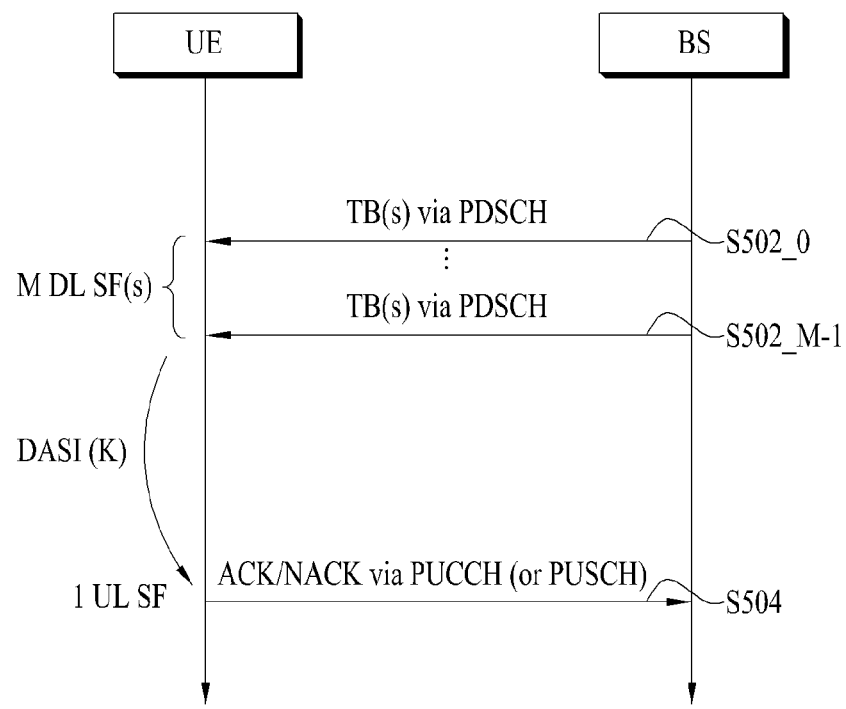
FIGS. 7 and 8 illustrate ACK/NACK(A/N) timing (or HARQ timing)
Figure 8:
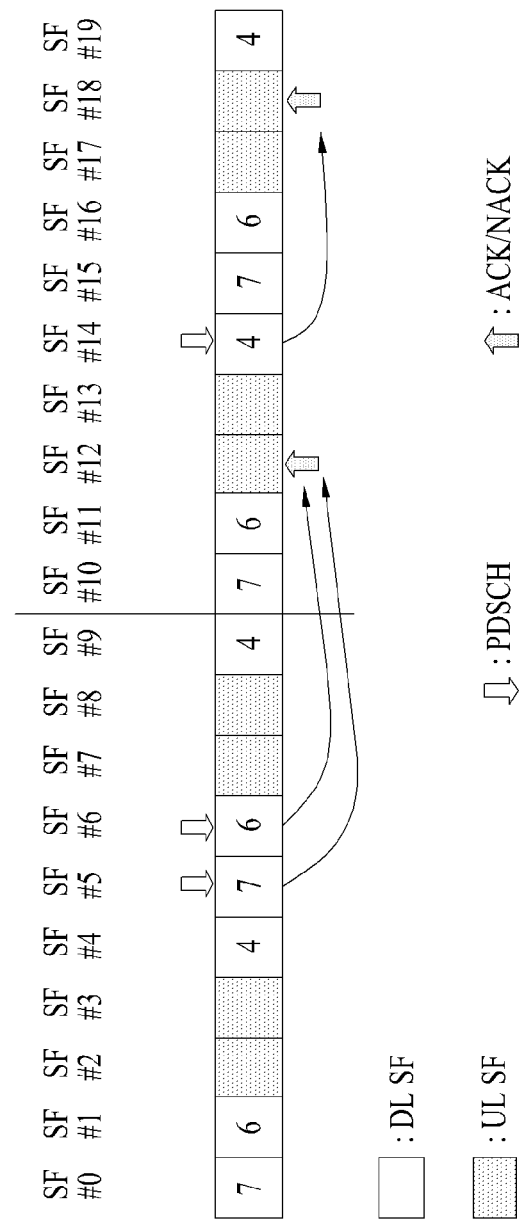

FIGS. 7 and 8 illustrate ACK/NACK (A/N) timing (or HARQ timing).

Referring to FIG. 7, a UE can receive one or more PDSCH signals in M DL subframes (SFs) (S502_0 to S502_M−1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically, ACK/NACK is transmitted through a PUSCH when a PUSCH is transmitted at ACK/NACK transmission time. Various PUCCH formats shown in Table 4 can be used for ACK/NACK transmission. To reduce the number of ACK/NACK bits transmitted through a PUCCH format, various methods such as ACK/NACK bundling and ACK/NACK channel selection can be used.

In FDD, M=1, and in TDD, M is an integer or 1 or more. In TDD, a relationship between M DL subframes and UL subframes at which A/N is transmitted is given by a downlink association set index (DASI).

Table 5 illustrates a DASI (K:{$k_0, k_1, k_{M-1}$}) defined for LTE(-A). If a PDCCH indicating PDSCH transmission and/or semi-persistent scheduling (SPS) release is present at subframe n−k (k∈K), a UE transmits ACK/NACK at subframe n. In FDD, DASI (for convenience, $d_F$)=4.

TABLE 5

| TDD UL-DL Configuration | Subframe n | | | | | | | | | |
|---|---|---|---|---|---|---|---|---|---|---|
|  | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In case of TDD mode operation, the UE should transmit A/N signals for one or more DL transmissions (e.g., PDSCH), which are received through M DL SFs, through one UL SF. The A/N signals for a plurality of DL SFs are transmitted through one UL SF as follows.

1) ACK/NACK bundling (A/N bundling): A/N bits for a plurality of data units (e.g., PDSCH, SPS release PDCCH, etc.) are combined by logic-AND operation. For example, if all data units are decoded successfully, an Rx node (e.g., UE) transmits an ACK signal. By contrast, if any one of all data units is failed in decoding (or detection), the Rx node either transmits a NACK signal or transmits none of the ACK signal and the NACK signal.

2) Channel selection (CHsel): A UE which has received a plurality of data units (e.g., PDSCH, SPS release PDCCH, etc.) reserves a plurality of PUCCH resources for A/N transmission. A/N responses to the plurality of data units are identified by combination PUCCH resources used for actual A/N transmission and A/N contents (e.g., bit value and QPSK symbol value) which are transmitted. The channel selection scheme is also referred to as an A/N selection scheme or a PUCCH selection scheme.

Table 6 illustrates a PUCCH selection transmission scheme (M=4) defined in the LTE system.

TABLE 6

| HARQ-ACK(0), HARQ-ACK(1), HARQ-ACK(2), HARQ-ACK(3) | Subframe $n^{(1)}_{PUCCH,X}$ | b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 6, HARQ-ACK(i) (0≤i≤3) indicates the HARQ ACK/NACK/DTX result of the i-th data unit. The HARQ ACK/NACK/DTX result means ACK, NACK, DTX (Discontinuous Transmission) or NACK/DTX. DTX represents that there is no transmission of a data unit corresponding to HARQ-ACK(i) or a UE fails to detect the presence of the data unit corresponding to HARQ-ACK(i). Maximum 4 PUCCH resources (i.e., $n^{(1)}_{PUCCH,0} \sim n^{(1)}_{PUCCH,3}$) may be reserved for each data unit. The multiplexed ACK/NACK signal is transmitted through one PUCCH resource selected from the reserved PUCCH resources. In Table 6, $n^{(1)}_{PUCCH,X}$ represents a PUCCH resource used for ACK/NACK transmission, and b(0)b(1) indicates two bits transmitted through the selected PUCCH resource, which are modulated using QPSK. For example, when the UE has decoded 4 data units successfully, the UE transmits bits (1, 1) to a BS through a PUCCH resource linked with $n^{(1)}_{PUCCH,1}$. Since combinations of PUCCH resources and QPSK symbols are not sufficient to represent all available ACK/NACK assumptions, NACK and DTX are coupled except some cases (NACK/DTX, N/D).

FIG. 8 illustrates A/N timing applied to CC for which UL-DL configuration #1 is configured. Each of SF #0~#9 and SF #10~#19 corresponds to a radio frame. Numbers in boxes indicate UL subframes associated with DL subframes. For example, ACK/NACK signal for a PDSCH of SF #5 is transmitted at SF #5+7(=SF #12), and ACK/NACK signal for a PDSCH of SF #6 is transmitted at SF #6+6(=SF #12). That is, ACK/NACK signals for SF #5/SF #6 are all transmitted at SF #12. ACK/NACK signal for a PDSCH of SF #14 is transmitted at SF #14+4(=SF #18).

Figure 9:
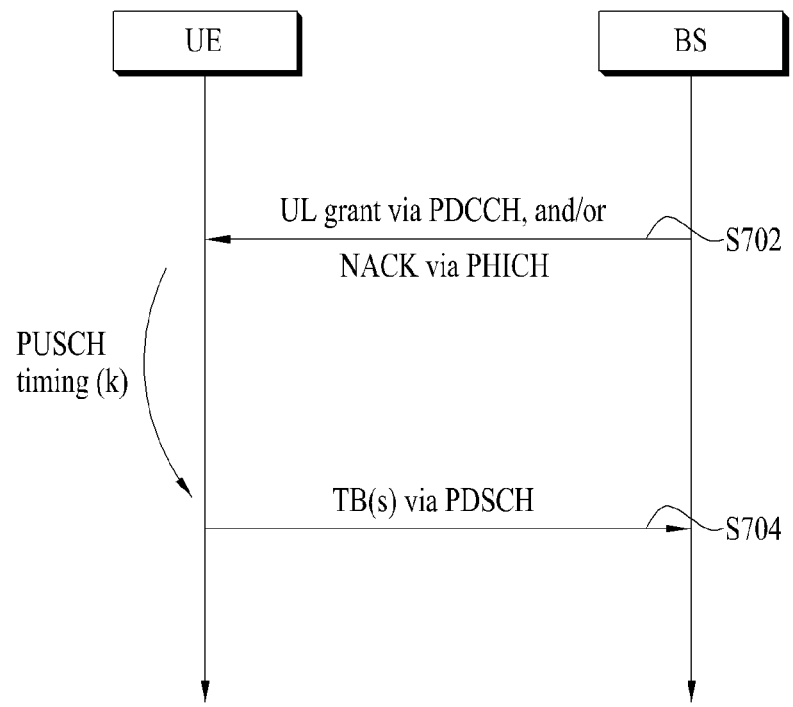
FIGS. 9 and 10 illustrate PHICH/UL grant (UL grant, UG)-PUSCH (Physical Uplink Shared Channel) timing.
Figure 10:
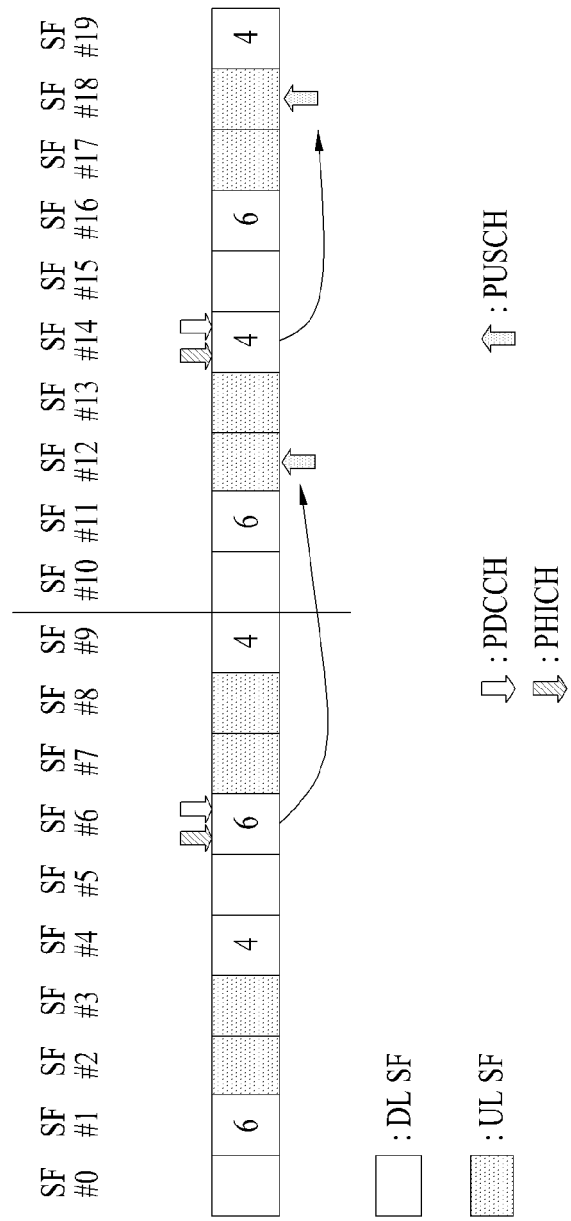

FIGS. 9 and 10 illustrate PHICH grant-PUSCH timing. A PUSCH can be transmitted corresponding to a PDCCH (UL grant) and/or a PHICH (NACK).

Referring to FIG. 9, the UE can receive a PDCCH (UL grant) and/or a PHICH (NACK) through a PDCCH (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swiping, PUSCH resource allocation, etc.) (S704). The present embodiment is based on the assumption that a normal HARQ operation in which a PUSCH is transmitted once is performed. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 7 shows a UAI (Unlink Association Index) (k) for PUSCH transmission in LTE(-A). Table 5 shows spacing between a DL subframe from which a PHICH/UL grant is detected and a UL subframe relating to the DL subframe. Specifically, when a PHICH/UL grant is detected from a subframe n, the UE can transmit a PUSCH in a subframe n+k. In FDD, UAI (i.e., k)=4.

TABLE 7

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | 4 | | | | | 4 | | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

FIG. 10 illustrates PUSCH transmission timing when UL-DL configuration #1 is configured. In the figure, SF #0 to #9 and SF #10 to #19 respectively correspond to radio frames, and numerals in blocks denote UL subframes relating to DL subframes. For example, a PUSCH corresponding to PHICH/UL grant of SF #6 is transmitted in SF #6+6 (=SF #12) and a PUSCH corresponding to a PHICH/UL grant of SF #14 is transmitted in SF #14+4 (=SF #18).

Figure 11:
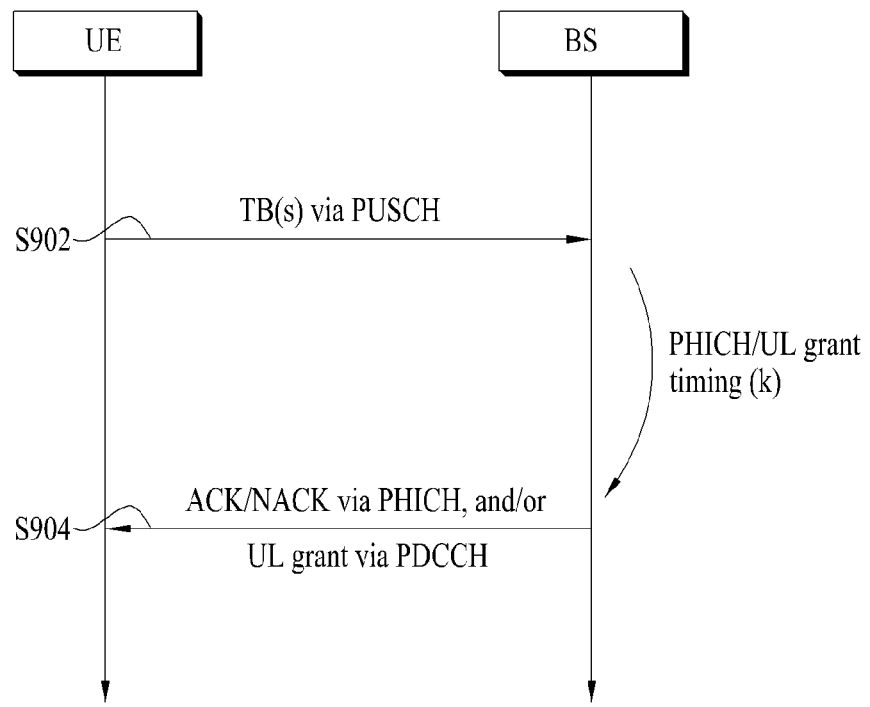
FIGS. 11 and 12 illustrate UL grant (UG)/PHICH timing.
Figure 12:
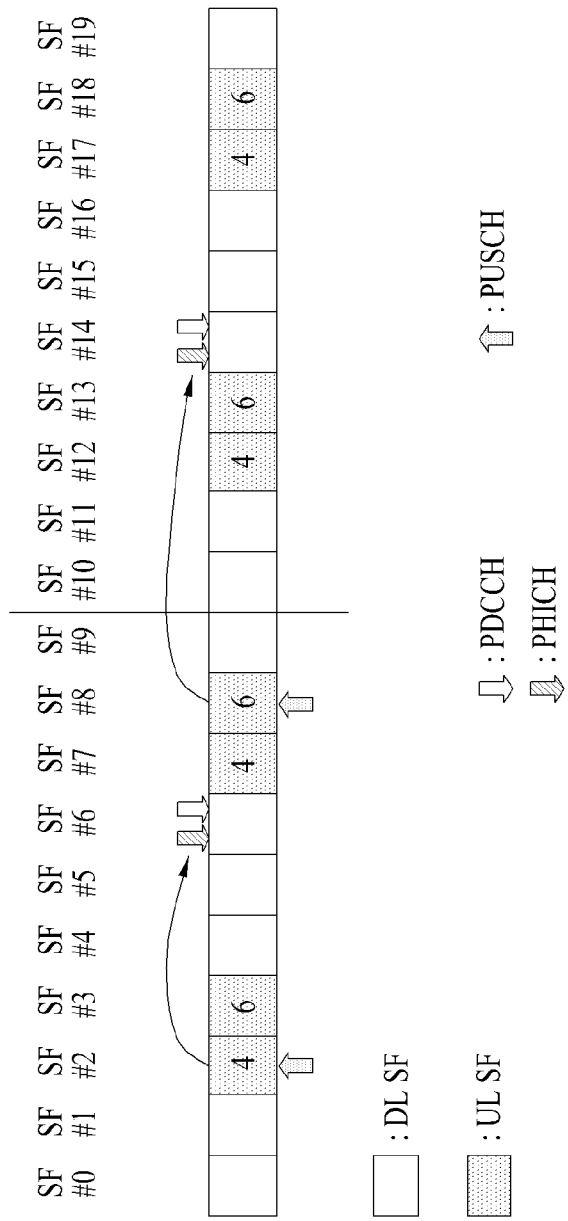

FIGS. 11 and 12 illustrate UL grant (UG)/PHICH timing. A PHICH is used to transmit DL ACK/NACK. Here, DL ACK/NACK means ACK/NACK transmitted on downlink as a response to UL data (e.g. PUSCH).

Referring to FIG. 11, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframe (S904). The present embodiment is based on the assumption that a normal HARQ operation in which a PUSCH is transmitted once is performed. In this case, a PHICH and UL grant used for PUSCH transmission can be transmitted in the same subframe. In case of subframe bundling, however, the PHICH and UL grant used for PUSCH transmission can be transmitted in different subframes.

Table 8 illustrates PHICH timing defined in TDD. For PUSCH transmission of subframe #n, the UE determines PHICH resource corresponding to subframe #(n+$k_{PHICH}$). In FDD, $k_{PHICH}$=4.

TABLE 8

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | | 4 | 7 | 6 | | | 4 | 7 | 6 |
| 1 | | | | 4 | 6 | | | | 4 | 6 | |
| 2 | | | 6 | | | | | | 6 | | |
| 3 | | | | 6 | 6 | 6 | | | | | |
| 4 | | | | 6 | 6 | | | | | | |
| 5 | | | | 6 | | | | | | | |
| 6 | | | | 4 | 6 | 6 | | | | 4 | 7 |

FIG. 12 illustrates UL grant/PHICH transmission timing when UL-DL configuration #1 is configured. In the figure, SF #0 to #9 and SF #10 to #19 respectively correspond to radio frames, and numerals in blocks denote DL subframes relating to UL subframes. For example, a UL grant/PHICH corresponding to a PUSCH of SF #2 is transmitted in SF #2+4 (=SF #6) and a UL grant/PHICH corresponding to a PUSCH of SF #8 is transmitted in SF #8+6 (=SF #14).

Figure 13:
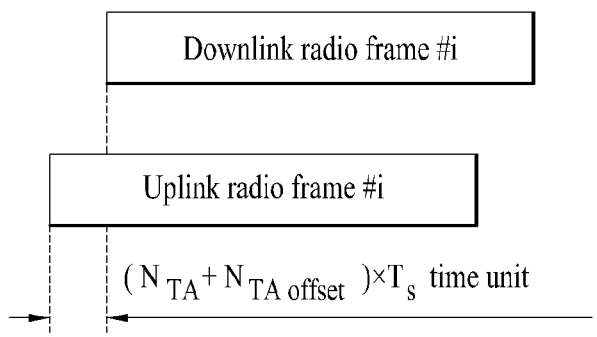
FIG. 13 illustrates uplink-downlink frame timing relation.

FIG. 13 illustrates uplink-downlink frame timing relation.

Referring to FIG. 13, transmission of the uplink radio frame number i starts prior to $(N_{TA}+N_{TAoffset})*T_s$ seconds from the start of the corresponding downlink radio frame. In case of the LTE system, $0 \leq N_{TA} \leq 20512$, $N_{TAoffset}=0$ in FDD, and $N_{TAoffset}=624$ in TDD. The value $N_{TAoffset}$ is a value in advance recognized by the BS and the UE. If $N_{TA}$ is indicated through a timing advance command during a random access procedure, the UE adjusts transmission timing of UL signal (e.g., PUCCH/PUSCH/SRS) through the above equation. UL transmission timing is set to multiples of $16T_s$. The timing advance command indicates the change of the UL timing based on the current UL timing. The timing advance command $T_A$ within the random access response is a 11-bit timing advance command, and indicates values of 0, 1, 2, . . . , 1282 and a timing adjustment value is given by $N_{TA}=T_A*16$. In other cases, the timing advance command $T_A$ is a 6-bit timing advance command, and indicates values of 0, 1, 2, . . . , 63 and a timing adjustment value is given by $N_{TA,new}=N_{TA,old}+(T_A-31)*16$. The timing advance command received at subframe n is applied from the beginning of subframe n+6. In case of FDD, as shown, transmitting timing of UL subframe n is advanced based on the start time of the DL subframe n. On the contrary, in case of TDD, transmitting timing of UL subframe n is advanced based on the end time of the DL subframe n+1 (not shown).

Figure 14:
FIG. 14 illustrates a carrier aggregation (CA)-based wireless communication system.

FIG. 14 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 14, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be configured cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of DL resources and UL resources. Yet, the UL resources are not mandatory. Therefore, a cell may be composed of DL resources only or both DL resources and UL resources. The linkage between the carrier frequencies (or DL CCs) of DL resources and the carrier frequencies (or UL CCs) of UL resources may be indicated by system information when CA is supported. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or reestablish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and one or more SCells, for a UE in an RRC_CONNECTED state, for which CA is set.

When a plurality of CCs is configured, cross-CC scheduling and non-cross-CC scheduling may be used. Non-cross-CC scheduling corresponds to scheduling in LTE. When cross-CC scheduling is applied, a DL grant PDCCH may be transmitted on DL CC#0 and a PDSCH corresponding thereto may be transmitted on DL CC#2. Similarly, a UL grant PDCCH may be transmitted on DL CC#0 and a PUSCH corresponding thereto may be transmitted on DL CC#4. For cross-CC scheduling, a carrier indicator field (CIF) is used. Presence or absence of a CIF in a PDCCH may be semi-statically and UE-specifically (or UE-group-specifically) configured through higher layer signaling (e.g. RRC signaling).

Scheduling according to the CIF may be arranged as follows.
  CIF disabled: a PDCCH on a DL CC is used to allocate a PDSCH resource on the same DL CC or a PUSCH resource on a linked UL CC.
  CIF enabled: a PDCCH on a DL CC can be used to allocate a PDSCH or PUSCH resource on a specific DL/UL CC from among a plurality of aggregated DL/UL CCs using the CIF.

When the CIF is present, the BS may allocate a monitoring DL CC to reduce blind detection complexity of the UE. For PDSCH/PUSCH scheduling, the UE may detect/decode a PDCCH only on the corresponding DL CCs. In addition, the BS may transmit a PDCCH only through the monitoring DL CC (set). The monitoring DL CC set may be UE-specifically, UE-group-specifically or cell-specifically configured.

Figure 15:
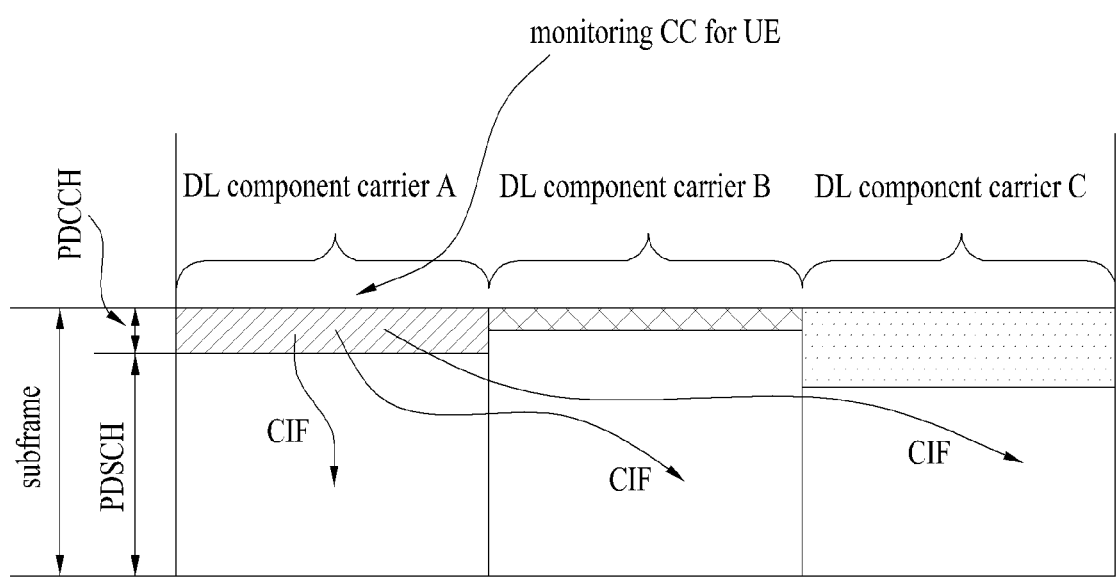
FIG. 15 illustrates a scheduling method when a plurality of cells is configured.

FIG. 15 illustrates cross-carrier scheduling. While the figure shows DL scheduling, cross-carrier scheduling is equally applied to UL scheduling.

Referring to FIG. 15, 3 DL CCs are configured for a UE, and DL CC A may be set as a PDCCH monitoring DL CC. When the CIF is disabled, each DL CC can transmit only a PDCCH that schedules a PDSCH corresponding to the DL CC without a CIF according to LTE PDCCH rule. When the CIF is enabled, DL CC A (i.e. MCC) can transmit not only a PDCCH that schedules the PDSCH corresponding to the DL CC A but also PDCCHs that schedule PDSCHs of other DL CCs using the CIF. In this case, a PDCCH is not transmitted in DL CC B/C.

Here, a specific CC (or cell) used to transmit scheduling information (e.g. PDCCH) is referred to as "monitoring CC (MCC)" which may be replaced by "monitoring carrier", "monitoring cell", "scheduling carrier", "scheduling cell", "scheduling CC", etc. A DL CC on which a PDSCH corresponding to a PDCCH is transmitted and a UL CC on which a PUSCH corresponding to a PUCCH is transmitted may be referred to as a scheduled carrier, a scheduled CC, a scheduled cell, etc. One or more scheduling CCs may be configured per UE. A scheduling CC may include a PCC. When only one scheduling CC is configured, the scheduling CC may be the PCC. The scheduling CC may be UE-specifically, UE-group-specifically or cell-specifically set.

In case of cross-CC scheduling, signal transmission may be performed as follows.
  PDCCH (UL/DL grant): scheduling CC (or MCC)
  PDSCH/PUSCH: CC indicated by a CIF of a PDCCH detected from a scheduling CC
  DL ACK/NACK (e.g. PHICH): scheduling CC (or MCC) (e.g. DL PCC)
  UL ACK/NACK (e.g. PUCCH): UL PCC
    In the following description, DL ACK/NACK may be referred to as DL A/N or PHICH and UL ACK/NACK may be referred to as UL A/N or A/N for convenience.

For a TDD-configured CC (or cell), when a UE transmits an ACK/NACK signal to a BS, a problem may occur as follows: if the UE has missed a part of PDCCH(s) transmitted from the BS for a period of a plurality of subframes, the UE does not even know that a PDSCH corresponding to the missed PDCCH has been transmitted to the UE and thus an error may occur during generation of ACK/NACK.

To solve this problem, a DL grant PDCCH/SPS release PDCCH for a TDD CC includes a DAI field (i.e., DL DAI field). The value of DL DAI field designates a cumulative value (i.e., counting value) of PDCCH(s) corresponding to PDSCH(s) and PDCCH(s) indicating downlink SPS release to a current subframe within DL subframe(s) n−k (k∈K). For example, if 3 DL subframes correspond to one UL subframe, PDSCHs transmitted at a period of 3 DL subframes are sequentially indexed (i.e., sequentially counted) and the index (or count) is delivered on a PDCCH for scheduling the PDSCHs. The UE may determine whether a previous PDCCH has been appropriately received, by checking DAI information of the PDCCH.

Figure 16:
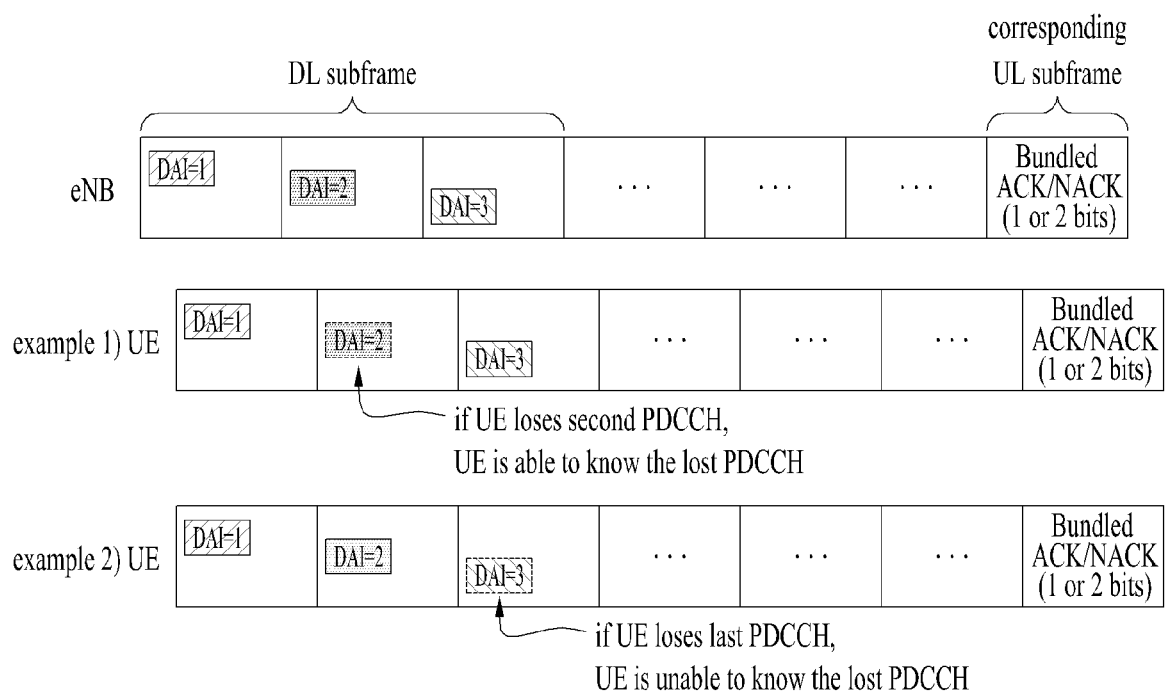
FIG. 16 illustrates ACK/NACK transmission based on DL DAI (Downlink Assignment Index)

FIG. 16 illustrates an ACK/NACK transmission procedure based on a DL DAI. This example assumes a TDD system configured by 3 DL subframes:1 UL subframe. It is assumed for convenience that a UE transmits ACK/NACK using PUSCH resources. In the LTE, when ACK/NACK is transmitted through a PUSCH, 1-bit or 2-bit bundled ACK/NACK is transmitted.

Referring to FIG. 16, if the second PDCCH is missed as shown in the first example (Example 1), since a DL DAI value of the third PDCCH is different from a currently detected number of PDCCHs, the UE may know that the second PDCCH is missed. In this case, the UE may process an ACK/NACK response to the second PDCCH as a NACK (or NACK/DTX). On the other hand, if the last PDCCH is missed as shown in the second example (Example 2), since the last detected DAI value of a PDCCH is equal to a currently detected number of PDCCHs, the UE may not recognize that the last PDCCH is missed (i.e., DTX). Accordingly, the UE recognizes that only two PDCCHs are scheduled for a DL subframe period. In this case, the UE bundles ACK/NACK corresponding to first two PDCCHs and thus an error occurs in an ACK/NACK feedback procedure. To solve this problem, a UL grant PDCCH also includes a DAI field (i.e., UL DAI field). The UL DAI field is a 2-bit field and includes information about the number of scheduled PDCCHs.

Table 9 shows values ($V^{DL}_{DAI}$, $V^{UL}_{DAI}$) indicated by a DAI field within a DCI format. $V^{DL}_{DAI}$ denotes a DL DAI value, and $V^{UL}_{DAI}$ denotes a UL DAI value. $V^{DL}_{DAI}$ denotes the value of the DAI field in DCI format 1/1A/1B/1D/2/2A/2B/2C/2D for UL-DL Configurations #0 to #6. $V^{DL}_{DAI}$ denotes the value of DAI field in DCI format 0/4 (i) if one CC (or cell) having UL-DL configurations #1 to #6 is configured, or (ii) if a UE is configured not to use a PUCCH format 3.

TABLE 9

| DAI MSB, LSB | $V_{DAI}^{UL}$ or $V_{DAI}^{DL}$ | Number of subframes with PDSCH transmission and with PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

MSB: Most significant bit.
LSB: Least significant bit.

Table 10 shows a value ($W^{UL}_{DAI}$) indicated by a DAI field in DCI format 0/4. $W^{UL}_{DAI}$) denotes the value of DAI field in DCI format 0/4 (i) if a plurality of CCs (or cells) having UL-DL Configurations #1 to #6 are configured, or (ii) if one CC (or cell) having UL-DL Configurations #1 to #6 is configured and a UE is configured to use a PUCCH format 3.

TABLE 10

| DAI MSB, LSB | $W_{DAI}^{UL}$ |
|---|---|
| 0, 0 | 1 |
| 0, 1 | 2 |
| 1, 0 | 3 |
| 1, 1 | 4 |

MSB: Most significant bit.
LSB: Least significant bit.

For convenience, unless otherwise mentioned, DL DAI is referred to as V, and UL DAI is referred to as W.

DAI is used in various ways in an ACK/NACK transmission procedure. For example, a DAI may be used for DTX detection as illustrated in FIG. 16, or used in an ACK/NACK payload generating procedure (e.g., determination of the size of ACK/NACK payload and the location of ACK/NACK information in the ACK/NACK payload) or ACK/NACK resource allocation procedure.

First of all, a description is now given of DTX detection using a DAI. In case of $V_{DAI}^{UL} \neq (U_{DAI}+N_{SPS}-1) \mod 4+1$, a UE generates a NACK for all codewords in accordance with a bundling procedure on the assumption that at least one DL assignment is missed (i.e., DTX occurs). $U_{DAI}$ denotes a total number of DL grant PDCCHs and SPS release PDCCHs detected at subframe n−k (k∈K) (see Table 5). $N_{SPS}$ denotes the number of SPS PDSCHs (0 or 1).

Then, a description is now given of ACK/NACK payload generation using a DAI. It is assumed for convenience that the PUCCH format 3 is configured. ACK/NACK payloads for the PUCCH format 3 are configured per cell and then arranged in the order of cell indexes. Specifically, HARQ-ACK feedback bits for a c-th serving cell (or DL CC) are given as $o_{c,0}^{ACK} o_{c,1}^{ACK}, \ldots, o_{c,O_c^{ACK}-1}^{ACK}$ (c≥0). $O_c^{ACK}$ denotes the number of bits (i.e., size) of HARQ-ACK payload of the c-th serving cell. Regarding the c-th serving cell, if a transmission mode for supporting transmission of a single transport block (TB) is configured or if space bundling is applied, it may be given as $O_c^{ACK}=B_c^{DL}$.

On the other hand, regarding the c-th serving cell, if a transmission mode for supporting transmission of a plurality of (e.g., 2) TBs is configured and space bundling is not applied, it may be given as $O_c^{ACK}=2B_c^{DL}$. If the HARQ-ACK feedback bits are transmitted through a PUCCH or if the HARQ-ACK feedback bits are transmitted through a PUSCH but there is no W corresponding to the PUSCH (e.g., SPS-based PUSCH), it is given as $B_c^{DL}=M$. M denotes the number of elements in set K defined in Table 5. If the TDD UL-DL Configurations are #1, #2, #3, #4, and #6 and if the HARQ-ACK feedback bits are transmitted through a PUSCH, it is given as $B_c^{DL}=W_{DAI}^{UL}$. $W_{DAI}^{UL}$ denotes a value indicated by a UL DAI field within a UL grant PDCCH (Table 10), and is simply referred to as W. If the TDD UL-DL Configuration is #5, it is given as $B_c^{DL}=W_{DAI}^{UL}+4\lceil(U-W_{DAI}^{UL})/4\rceil$. In this case, U denotes a maximum value among Ucs, and Uc denotes a total number of PDCCHs indicating (downlink) SPS release and PDSCH(s) received at subframe n−k of the c-th serving cell. Subframe n is a subframe for transmitting the HARQ-ACK feedback bits. ⌈ ⌉ denotes a ceiling function.

Regarding the c-th serving cell, if a transmission mode for supporting transmission of a single TB is configured or if space bundling is applied, the location of each ACK/NACK in HARQ-ACK payload of the serving cell is given as $o_{c,DAI(k)-1}^{ACK}$. DAI(k) denotes a DL DAI value of a PDCCH detected at DL subframe n−k. On the other hand, regarding the c-th serving cell, if a transmission mode for supporting transmission of a plurality of (e.g., 2) TBs is configured and space bundling is not applied, the location of each ACK/NACK in HARQ-ACK payload of the serving cell is given as $o_{c,2DAI(k)-2}^{ACK}$ and $o_{c,2DAI(k)-1}^{ACK}$. $o_{c,2DAI(k)-2}^{ACK}$ denotes HARQ-ACK for codeword 0, and $o_{c,2DAI(k)-1}^{ACK}$ denotes HARQ-ACK for codeword 1. Codeword 0 and codeword 1 may respectively correspond to TB0 and TB1, or TB1 and TB0 according to swapping. If the PUCCH format 3 is transmitted at a subframe configured for SR transmission, the PUCCH format 3 transmits ACK/NACK bits and a 1-bit SR together.

Next, a description will be given of a method for determining an ACK/NACK transmission resource in case of L-PDCCH based scheduling. If PUCCH format 1a/1b (hereinafter, referred to as PF1) is configured for A/N transmission, an ACK/NACK transmission resource for DL data, which is scheduled by a DL grant L-PDCCH, may be determined as a PUCCH resource linked to a specific ECCE index (e g, minimum ECCE index) constituting the DL grant L-PDCCH (implicit PUCCH resource). Specifically, in the LTE/LTE-A, a PF1 resource index is determined as follows.

$$n^{(1)}_{PUCCH} = n_{CCE} + N^{(1)}_{PUCCH} \qquad \text{[Equation 1]}$$

$$n^{(1)}_{PUCCH} = n_{CCE} + N^{(1)}_{PUCCH} \qquad \text{[Equation 1]}$$

In this case, $n^{(1)}_{PUCCH}$ indicates a resource index of PF1 for ACK/NACK/DTX transmission, $N^{(1)}_{PUCCH}$ indicates a signaling value received from a higher layer (e.g., Radio Resource Control (RRC)), and $n_{CCE}$ indicates the smallest value from among CCE indexes used for L-PDCCH transmission. A CS (Cyclic Shift), an OC (Orthogonal Code) and a PRB (Physical Resource Block) for PF1 are obtained from $n^{(1)}_{PUCCH}$.

If the PUCCH format 3 (PF3) is configured for A/N transmission, a specific PF3 resource index among a plurality of PF3 resource indexes ($n^{(3)}_{PUCCH}$) allocated by a higher layer (e.g., RRC) can be indicated by an AR1 (ACK/NACK Resource Indicator) of the DL grant L-PDCCH (explicit PUCCH resource). The ARI is transmitted through a TPC field of an L-PDCCH that schedules a PDSCH of an SCell. An OC and a PRB for PF3 are obtained from $n^{(3)}_{PUCCH}$.

Meanwhile, even in case of EPDCCH based scheduling, an ACK/NACK transmission resource for DL data scheduled by a DL grant EPDCCH can be determined as a PUCCH resource linked to a specific ECCE index (e g, minimum ECCE index) constituting the DL grant EPDCCH or an ECCE index obtained by adding a specific offset value to the specific ECCE index. Also, an ACK/NACK feedback transmission resource can be determined as a PUCCH resource linked to a specific ECCE index (e g, minimum ECCE index) constituting the DL grant EPDCCH or an ECCE index obtained by adding a specific offset value to the specific ECCE index. In this case, the specific offset value can be determined by a value, which is directly signaled through an ARO (ACK/NACK Resource Offset) field in the DL grant EPDCCH, and/or a value designated per AP (Antenna Port). Specifically, information signaled through the TPC field and the ARO field in the DL grant EPDCCH in accordance with frame structure type (e.g., FDD or TDD) and feedback transmission method (e.g., PF3 or CHsel) can be configured as follows. For convenience, a TPC command for PUCCH power control is defined as "TPC value", an offset value added when an implicit PUCCH index is determined is defined as "ARO value", and an ARI that indicates a specific one of a plurality of PF3 indexes or a plurality of PF1 indexes (groups) allocated through RRC is defined as "ARI value". In addition, a fixed value (e.g., "0") that is inserted (for virtual CRC or the like) without containing no information is defined as "fixed value".

1) FDD with PF3
  A. TPC field
    i. DL grant that schedules a PCell: TPC value
    ii. DL grant that schedules a SCell: ARI value
  B. ARO field
    i. DL grant that schedules a PCell: ARO value
    ii. DL grant that schedules an SCell: fixed value
2) FDD with CHsel
  A. TPC field
    i. DL grant that schedules a PCell: TPC value
    ii. DL grant that schedules an SCell: ARI value
  B. ARO field
    i. DL grant transmitted through a PCell: ARO value
    ii. DL grant transmitted through an SCell: fixed value
3) TDD with PF3
  A. TPC field
    i. DL grant that schedules a PCell: TPC value
    ii. DL grant that schedules an SCell: ARI value
  B. ARO field
    i. DL grant that schedules a PCell and corresponds to DAI=1: ARO value
    ii. DL grant that schedules a PCell and does not correspond to DAI=1: ARI value
    iii. DL grant that schedules an SCell: fixed value
4) TDD with CHsel
  A. TPC field
    i. DL grant that schedules a PCell: TPC value
    ii. DL grant that schedules an SCell: ARI value
  B. ARO field
    i. DL grant transmitted through a PCell: ARO value
    ii. DL grant transmitted through an SCell: fixed value Meanwhile, aggregation of a plurality of CCs having different SF configurations as well as aggregation of a plurality of CCs having the same SF configuration can be performed. For example, aggregation of a plurality of CCs having different SF configurations includes aggregation of a plurality of CCs having different UL-DL Configurations (referred to as different TDD CA for convenience), and aggregation of TDD CC and FDD CC.

Cross-CC scheduling may be supported even when a plurality of CCs having different SF configurations are aggregated. In this case, UL grant/PHICH timing (see FIGS. 11 and 12) configured for an MCC and SCC may be different. Therefore, to transmit a UG/PHICH for UL data transmitted through an MCC UL SF, and an SCC UL SF cross-CC-scheduled through the MCC, the same or different UG/PHICH timing (set to a specific UL-DL configuration) may be applied per CC or UG/PHICH timing configured for the specific UL-DL configuration may be commonly applied to all CCs (i.e., PCC (or MCC) and SCC). The specific UL-DL configuration (hereinafter, referred to as a reference configuration (Ref-Cfg)) may correspond to a UL-DL configuration (MCC-Cfg) set to the PCC (or MCC) or a UL-DL configuration (SCC-Cfg) set to the SCC or may be determined as a UL-DL configuration other than MCC-Cfg and SCC-Cfg. In this case, UG or PHICH timing may refer to D configured to transmit/receive a UG that schedules UL data of a specific U and a PHICH for transmission of the corresponding UL data or timing relationship thereof. Specifically, application of UL grant or PHICH timing set to the specific CC (i.e. Ref-CC) or specific UD-cfg (i.e. Ref-cfg) may refer to use of UD-Cfg of the specific CC or a parameter value corresponding to the specific UD-cfg in Tables 7 and 8.

Meanwhile, when PDCCH/PDSCH-to-ACK/NACK timing (e.g., 4 ms) defined in the legacy FDD cell is applied to a PDSCH of a FDD cell in TDD PCell-FDD SCell CA, ACK/NACK cannot be transmitted if the TDD PCell is defined by a DL subframe at ACK/NACK transmission timing. Therefore, a new DL HARQ timing not the PDCCH/PDSCH-to-ACK/NACK timing defined in the legacy FDD cell may be applied. Likewise, a new HARQ timing may also be applied to UL HARQ timing. Currently possible HARQ timings are summarized as follows.

1) DL HARQ timing (PDSCH to HARQ-ACK timing) for TDD SCell in case of FDD PCell
  A. Self-scheduling case: follow DL HARQ timing of FDD PCell
  B. Cross-carrier scheduling case: follow DL HARQ timing of FDD PCell
2) UL HARQ timing (UL grant DCI to PUSCH, PUSCH to PHICH) for TDD SCell in case of FDD PCell
  A. Self-scheduling case: follow UL HARQ timing of TDD scheduled cell timing
  B. Cross-carrier scheduling case
    i. Option UL-A1:
      1. For FDD scheduling case, follow TDD scheduled cell timing
      2. For TDD scheduling cell case, reference U/D configuration for UL timing is derived by scheduling and scheduled cells U/D configuration following Rel-11 LTE rule.
    ii. Option UL-B1
      1. For FDD scheduling cell case, 4 ms for UL grant to PUSCH, 6 ms for PUSCH to PHICH
      2. For TDD scheduling case, reference U/D configuration for UL timing is derived by scheduling and scheduled cells U/D configuration following Rel-11 LTE rule.
3. DL HARQ timing (PDSCH to HARQ-ACK timing) for FDD SCell in case of TDD PCell
  A. Self-scheduling case
    i. Option 1: for each TDD PCell U/D configuration, follow TDD PCell timing+additional new timings for the DL subframes for which DL HARQ timing is not defined in TDD PCell timing (or new timings for each TDD PCell U/D configuration to address more DL subframes than defined in TDD PCell)
    ii. Option 2: Follow reference U/D configuration defined (or configured) for the FDD SCell. (Configurable) reference U/D configuration depends on the TDD PCell's U/D configuration. (new timing can be added to the reference U/D configuration to support more DL subframes with HARQ-ACK feedback)
B. Cross-carrier scheduling case: same options (option 1 and option 2) as in self-scheduling case, or else, only follow TDD PCell timing
4) UL HARQ timing (UL grant DCI to PUSCH, PUSCH to PHICH) for FDD SCell in case of TDD PCell
A. Self-scheduling case: follow FDD scheduled cell timing
B. Cross-carrier scheduling case
  i. Option UL-A2:
    1. For TDD scheduling cell case, follow scheduling cell timing
    2. For FDD scheduling cell case, follow FDD timing
  ii. Option UL-B2:
    1. For TDD scheduling cell case, 4 ms for UL grant to PUSCH, 6 ms for PUSCH to PHICH
    2. For FDD scheduling cell case, follow FDD timing Table 11 illustrates examples of HARQ timing (e.g., DASI) according to DL HARQ option 1. In Table 10, HARQ timing means type/index of HARQ timing configured for TDD PCell U/D configuration, and [ ] means a DASI newly generated for the TDD PCell U/D configuration. Tables 12 to 14 illustrate examples of reference U/D configuration applicable to the FDD SCell in DL HARQ option 2.

TABLE 11

| TDD PCell UL-DL Cfg | HARQ timing | \multicolumn{10}{c}{subframe n} |
| | | 0 | 1 | 2 | 3 | 4 | 5 | 6 | 7 | 8 | 9 |
| --- | --- | --- | --- | --- | --- | --- | --- | --- | --- | --- | --- |
| 0 | 0A | — | — | 6, [5] | [5], [4] | 4 | — | — | 6, [5] | [5], [4] | 4 |
| 0 | 0B | — | — | 6, [5], [4] | | [5], 4 | — | — | 6, [5], [4] | | [5], 4 |
| 1 | 1 | — | — | 7, 6, [5] | [5], 4 | — | — | — | 7, 6, [5] | [5], 4 | — |
| 1 | 1* | — | — | 7, 6 | [6], [5], 4 | — | — | — | 7, 6 | [6], [5], 4 | — |
| 2 | 2 | — | — | 8, 7, 6, [5], 4 | — | — | — | — | 8, 7, 6, [5], 4 | — | — |
| 3 | 3 | — | — | 11, [10], [9], [8], 7, 6 | 6, 5 | 5, 4 | — | — | — | — | — |
| 3 | 3a | — | — | 11, [10], 7, 6 | [10], 6, 5 | [10], 5, 4 | | | | | |
| 4 | 4 | — | — | 12, 11, [10], [9], 8, 7 | 7, 6, 5, 4 | | | | | | |
| 4 | 4a | — | — | 12, 11, [10], 8, 7 | [10], 7, 6, 5, 4 | | | | | | |
| 5 | 5 | — | — | 13, 12, 11, [10], 9, 8, 7, 6, 5, 4 | — | — | — | — | — | — | — |
| 6 | 6 | — | — | [8], 7 | 7, [6] | [6], 5 | — | — | 7 | 7, [6], [5] | — |
| 6 | 6* | — | — | 7 | 7, [6], [5] | 5 | — | — | 7, [6], [5], [4] | 7 | — |

TABLE 12

| TDD PCell U/D cfg | Allowed reference configuration for FDD SCell |
| --- | --- |
| 0 | {0, 1, 2, 3, 4, 5, 6} |
| 1 | {1, 2, 4, 5} |
| 2 | {2, 5} |
| 3 | {3, 4, 5} |
| 4 | {4, 5} |
| 5 | {5} |
| 6 | {1, 2, 3, 4, 5, 6} |

TABLE 13

| TDD PCell U/D cfg | Allowed reference configuration for FDD SCell |
| --- | --- |
| 0 | {2, 4, 5} |
| 1 | {2, 4, 5} |
| 2 | {2, 5} |
| 3 | {4, 5} |
| 4 | {4, 5} |
| 5 | {5} |
| 6 | {2, 4, 5} |

TABLE 14

| TDD PCell U/D cfg | Allowed reference configuration for FDD SCell (2 aggregated cells) | Allowed reference configuration for FDD SCell (more than 2 aggregated cells) |
| --- | --- | --- |
| 0 | 5 | 2 |
| 1 | 5 | 2 |
| 2 | 5 | 2 |
| 3 | 5 | 4 |
| 4 | 5 | 4 |
| 5 | 5 | Not applicable |
| 6 | 5 | 2 |

Embodiment: Assigning/Transmitting Control Information when Dynamic Subframe is Reconfigured In a next system appearing after LTE, a scheme of dynamically reconfiguring/changing UL/DL SF direction is considered to perform eIMTA (enhanced interference mitigation and traffic adaptation) (i.e., eIMTA) and the like in a TDD situation. To this end, it is considering a scheme that a basic UL-DL configuration (UD-cfg) of a TDD cell (or CC) is (semi-)statically configured using higher layer signaling (e.g., SIB) and an operation UD-cfg of the cell (or CC) is dynamically reconfigured/changed using lower layer signaling (e.g., L1 (layer 1) signaling (e.g., PDCCH)). For clarity, the basic UD-cfg is referred to as SIB-cfg and the operation UD-cfg is referred to as actual-cfg. A subframe configuration according to UD-cfg is configured based on Table 1. And, in the present invention, a DL SF, a UL SF, and a special SF are referred to as D, U, and S, respectively.

In relation to this, in case of performing reconfiguration from D to U (or S), when DL reception/measurement of a legacy UE using a CRS is considered in the D, it may be difficult to perform the DL reception/measurement or it may cause deterioration. On the contrary, in case of performing reconfiguration from U (or S) to D, if an eNB does not schedule or configure a UL signal capable of being transmitted by a legacy UE via the U on purpose, it may be able to provide an additional DL resource to an eIMTA UE.

In consideration of this, the actual-cfg can be selectively determined from among the UD-cfg including all Ds on the SIB-cfg. In particular, although UD-cfg of which all Ds are assigned to D position on the SIB-cfg is determined as the actual-cfg, it is difficult to determine UD-cfg of which U is assigned to a D position of SIB-cfg as actual-cfg. Meanwhile, in order to set HARQ timing (e.g., HARQ-ACK feedback transmission timing) for DL scheduling, it may be able to separately configure a reference UD-cfg (hereinafter, D-ref-cfg) via higher layer (signaling) in an eIMTA. The actual-cfg can be selectively determined from among UD-cfgs including all Us on the D-ref-cfg (including the D-ref-cfg) only in consideration of the separately configured reference UD-cfg. Hence, it is difficult to determine UD-cfg of which D is assigned to U position of the D-ref-cfg as the actual-cfg.

Hence, the D-ref-cfg is configured as UD-cfg including all Ds for available actual-cfg candidates and the SIB-cfg can be configured as UD-cfg including all Us for available actual-cfg candidates. In particular, the D-ref-cfg is configured as a D superset UD-cfg for available actual-cfg candidates and the SIB-cfg can be configured as a U superset for available actual-cfg candidates. In this case, UD-cfg (i.e., U-ref-cfg) becoming a reference for HARQ timing (e.g., UL grant/PUSCH/PHICH transmission timing) for UL scheduling can be configured by the SIB-cfg. Hence, U on the D-ref-cfg and D on the SIB-cfg can be considered as a fixed U and a fixed D, respectively. An SF corresponding to D on the D-ref-cfg and U on the SIB-cfg can be considered as a flexible U only capable of being reconfigured or changed to D from U. The flexible U can be reconfigured or changed to D from U by the actual-cfg.

In particular, after the SIB-cfg/D-ref-cfg is configured via higher layer (signaling), one of UD-cfgs including all Ds on the SIB-cfg and all Us on the D-ref-cfg can be configured as the actual-cfg by L1 signaling.

Meanwhile, in a FDD system, it may consider a situation of applying eIMTA in a manner of reconfiguring a part of UL SF on a UL carrier by a DL SF (and/or a special SF) (hereinafter, FDD eIMTA).

Figure 17:
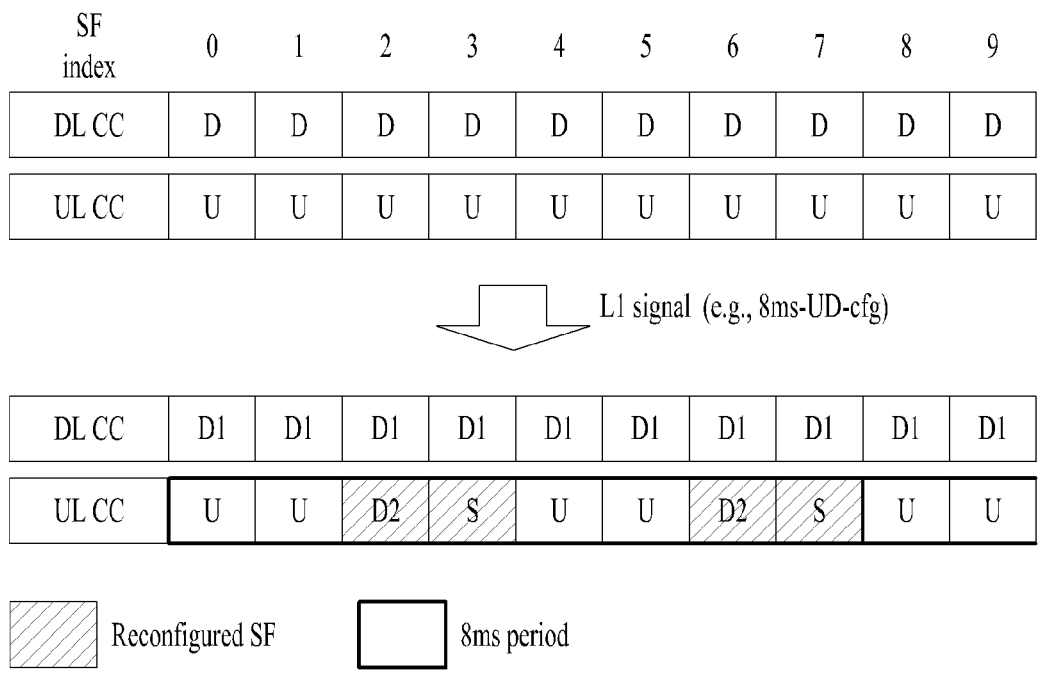
FIG. 17 illustrates FDD eIMTA (Frequency Division Duplex enhanced Interference Mitigation and Traffic Adaptation) system.

FIG. 17 illustrates an example of a FDD eIMTA scheme. Referring to FIG. 17, a UL resource of an FDD cell can be dynamically reconfigured/changed using L1 signaling (e.g., PDCCH). The present example assumes a case that a UL/DL SF structure of 8 ms-period is applied to UL CC to make PUSCH scheduling-related HARQ timing including PUSCH-to-PUSCH RTT (round-trip-time) to be maintained/applied in a manner of being identical to that of a legacy FDD. Hence, similar to the legacy FDD, PUSCH-to-PUSCH timing interval is maintained/applied by 8 ms or SFs (hereinafter, ms) and UL grant/PHICH-to-PUSCH and PUSCH-to-PHICH/UL grant timing can be maintained/applied by 4 ms. Hence, PDSCH transmission is enabled on UL CC, whereas PUSCH/PUCCH transmission is restricted. L1 signaling for dynamic SF reconfiguration on UL CC (hereinafter, actual-cfg or L1-cfg) can be signaled with a prescribed period. For clarity, DL SF on DL CC is referred to as D1 and a reconfigured SF on UL CC (i.e., UL SF->DL SF or S SF) is referred to as D2, respectively.

It may be necessary to have a method of defining/configuring HARQ timing (reference) (e.g., D-ref-cfg) for PDSCH transmitted on DL/UL CC in response to the dynamic change of a UL resource on UL CC in FDD cell. Hence, the present invention proposes a method of determining actual-cfg for a FDD eIMTA scheme based on 8 ms-period-based UD-cfg configuration on UL CC and HARQ timing. In the present invention, PDCCH can include not only legacy PDCCH but also EPDCCH of a new form (unless there is a separate distinction). And, in terms of UL resource reconfiguration, both D and S can be handled as D or can be commonly referred to as D.

UL-DL Reconfiguration for UL CC (i.e., Actual-Cfg)

In case of UL-DL configuration for dynamic SF reconfiguration on UL CC (i.e., actual-cfg), the actual-cfg can be optionally selected from UD-cfgs including all Us on D-ref-UC (i.e., D-ref-UC of which all Us arranged to U position on D-ref-UC) among 8 ms-period-based UD-cfgs (i.e., 8 ms-UD-cfgs) shown in Table 15 in the following and/or SF configurations that all SFs are configured by UL only (i.e., UL-only-cfg). In this case, it may be able to restrict UD-cfg of which D is arranged to U position on the D-ref-UC not to be determined as the actual-cfg. In this case, the D-ref-UC corresponds to a reference UL-DL configuration for DL HARQ timing for PDSCH on UL CC. Regarding the D-ref-UC, it shall be explained in more detail later.

In addition, the actual-cfg can be optionally selected from UD-cfgs including all Ds on U-ref-UC among 8 ms-UD-cfgs and/or UL-only-cfg. In this case, it may be able to restrict UD-cfg of which U is arranged to a D position on the U-ref-UC not to be determined as the actual-cfg. In this case, the U-ref-UC corresponds to a reference UL-DL configuration for UL HARQ timing for PUSCH on UL CC. Regarding the U-ref-UC, it shall be explained in more detail later.

Table 15 shows the 8 ms-UD-cfg according to a UL/DL configuration ratio within 8 ms-period (i.e., number of Us configured in 8 ms-period) and an arrangement form between ULs (e.g., localized form or a distributed form). In Table 15, "SF order" may simply indicate SF order in time or SF number/index. And, in "scheduling" of Table 1, "self+cross" corresponds to a case that both a configuration of (cross) scheduling UL CC from DL CC and a configuration of (self) scheduling from a UL CC itself are permitted. On the contrary, "cross only" corresponds to a case that a configuration of (cross) scheduling UL CC from DL CC is permitted only.

TABLE 15

| UL/DL ratio | SF order | 0 | 1 | 2 | 3 | 4 | 5 | 6 | 7 | scheduling |
|---|---|---|---|---|---|---|---|---|---|---|
| 1 UL per 8 ms | actual-cfg 1-1 | U | D | D | D | D | D | D | S | self + cross |
| 2 ULs per 8 ms | actual-cfg 2-1 | U | U | D | D | D | D | D | S | self + cross |
|  | actual-cfg 2-2 | U | D | D | S | U | D | D | S | cross only |
| 3 ULs per 8 ms | actual-cfg 3-1 | U | U | U | D | D | D | D | S | self + cross |
|  | actual-cfg 3-2 | U | D | S | U | D | S | U | S | self + cross |
|  | actual-cfg 3-3 | U | U | D | S | U | D | D | S | cross only |
|  | actual-cfg 3-4 | U | U | D | D | S | U | D | S | cross only |

TABLE 15-continued

| UL/DL ratio | SF order | 0 | 1 | 2 | 3 | 4 | 5 | 6 | 7 | scheduling |
|---|---|---|---|---|---|---|---|---|---|---|
| 4 ULs per 8 ms | actual-cfg 4-1 | U | U | U | U | D | D | D | S | self + cross |
|  | actual-cfg 4-2 | U | S | U | S | U | S | U | S | cross only |
|  | actual-cfg 4-3 | U | U | D | S | U | U | D | S | cross only |

Meanwhile, signaling of actual-cfg indicating dynamic SF reconfiguration on UL CC can be transmitted from an eNB with a prescribed period. When actual-cfg configuration of 8 ms-units is considered based on 10 ms radio frame duration and 8 ms-UD-cfg, a period of transmitting the actual-cfg signaling can be configured by 40 ms or a multiple of 40 ms. Hence, a period of receiving/detecting the actual-cfg signaling or a period of applying/changing actual-cfg on UL CC can be configured by 40 ms or a multiple of 40 ms.

Meanwhile, an S SF configuration applied to UL CC can be configured via higher layer signaling (e.g., RRC) to configure an actual-cfg-based SF. In this case, the S SF configuration can include number of time/symbols corresponding to DwPTS or DL section, number of time/symbols corresponding to UpPTS or UL section, etc. Preferably, it may not configure the UpPTS or the UL section in the S SF on UL CC. In addition, a DL CP length (e.g., normal or extended) for receiving a DL signal/channel on UL CC i) can be independently configured via higher layer signaling such as RRC and the like or ii) can be configured to be identical to a DL CP length applied to a DL CC or a UL CP length applied to a UL CC.

Meanwhile, in case of a TA offset parameter (i.e., $N_{TA\ offset}$), which is applied to transmit a UL signal (e.g., PRACH preamble) on UL CC, between UL frame transmission start timing and DL frame reception start timing, i) the parameter can be configured by a value (e.g., 624) greater than 0 in consideration of a TDD transmission and reception (switching) operation (in a UE) or ii) the parameter can be configured/assumed to be started in a manner that DL frame transmission (from an eNB) is delayed in a state of being set to 0 in accordance with FDD.

PDSCH HARQ Timing for UL CC (i.e. D-Ref-UC)

In case of DL HARQ timing (D-ref-UC) for PDSCH on UL CC, the D-ref-UC can be configured by one of specific UD-cfgs including relatively more DL resources (e.g., actual-cfg 1-1, 2-1, or 2-2 of which the number of Us within 8m5-period is configured by 1 or 2) or via higher layer signaling such as RRC and the like. Table 16 shows a DASI (DL assignment set index) for determining 8 ms-UD-cfg-based DL HARQ timing.

HARQ-num) in the DL grant DCI format, which schedules PDSCH on UL CC, can be configured in a manner of being identical to a case of TDD (e.g., 4 bits). On the contrary, a size of a HARQ process number field included in the DL grant DCI format, which schedules PDSCH on UL CC, can be configured in a manner of being identical to a case of FDD (e.g., 3 bits). And, it may be able to additionally configure an aperiodic SRS request field in a specific DL grant DCI format (e.g., DCI format 2B/2C/2D) that schedules PDSCH on UL CC. In this case, an eNB can indicate a UE to perform SRS transmission via the aperiodic SRS request field.

Meanwhile, it may not configure a common PDCCH search space (i.e., CSS) to D (D2), which is reconfigured on UL CC, while UE-specific PDCCH search space (i.e., USS) is configured only. This is because, since RRC reconfiguration is not performed on the UL CC, it is able to more secure an opportunity of using an additional function capable of being set to the USS (DCI format) only. In case of a DL grant DCI for scheduling the D2, the DL grant DCI may not be transmitted via a CSS while being transmitted via a USS only. A UE may operate under an assumption that CSS-based scheduling is restricted to be performed maximum one time only in a TDD bundling window corresponding to one HARQ-ACK transmission timing and/or the CSS-based scheduling is performed via D1 with legacy timing only. For example, the UE monitors the CSS and the USS at D1 with legacy timing and monitors the USS only at the other DL SF (D1 with non-legacy timing, D2). The legacy timing indicates a timing offset relationship (e.g., 4 ms or 4 SFs) between PDCCH/PDSCH transmission transmitted on DL CC in a legacy FDD system and corresponding HARQ-ACK transmission transmitted on UL CC.

Meanwhile, in order to configure a DL signal in D, which is reconfigured on UL CC, i) it may use a CRS transmission-related parameter applied to DL CC as it is, or ii) it may be able to separately configure an independent CRS transmission-related parameter. In this case, the independent CRS transmission-related parameter can include at least one selected from the group consisting of number of CRS antenna ports, a CRS frequency shift (i.e., V-shift) value, and a (virtual) cell ID (or a parameter corresponding to the cell

TABLE 16

| UL/DL ratio | SF order | 0 | 1 | 2 | 3 | 4 | 5 | 6 | 7 |
|---|---|---|---|---|---|---|---|---|---|
| 1 UL per 8 ms | actual-cfg 1-1 | 4/5/6/7/9/10/11 | — |  |  |  | — | — | — |
| 2 ULs per 8 ms | actual-cfg 2-1 | 4/6/10 | 4/6/10 | — | — | — | — | — | — |
|  | actual-cfg 2-2 | 5/6/7 | — | — | — | 5/6/7 | — | — | — |

Meanwhile, it may be able to additionally configure a DL DAI field in a DL grant DCI format that schedules PDSCH on UL CC. In this case, a DL DAI value can be indicated via the DL DAI field. On the contrary, the DL DAI field is not configured in a DG DCI format that schedules PDSCH on DL CC. And, a size of a HARQ process number field (i.e., ID). Hence, it may not configure/transmit a separate PBCH via the D which is reconfigured on UL CC.

And, in case of a PSS/SSS signal transmission period for performing DL synchronization on UL CC, i) PSS/SSS transmission/reception is temporarily omitted only when a transmission target SF corresponds to U (or S) on actual-cfg while the period is identically maintained by 5 ms, or ii) the period can be configured by 8 ms or a multiple of 8 ms (e.g., 40 ms) in accordance with SF reconfiguration based on 8 ms-UD-cfg. And, in case of a PSS/SSS signal transmission resource (e.g., subframe number, symbol index), i) it can be configured to be identical to a case of legacy TDD in accordance with an SF configuration in 8 ms-UD-cfg of TDD form, ii) it can be configured to be identical to a case of FDD to prevent unnecessary cell search of a different UE operating in TDD, or iii) a separate resource can be configured to avoid collision with different DL signal (e.g., CSI-RS, DMRS) transmission. The separate resource for DL synchronization can be configured in advance or via higher layer signaling such as RRC and the like. In FDD, a PSS is located at a last OFDM symbol of a slot #0/#10 and an SSS is located at an OFDM symbol immediate before the last OFDM symbol of the slot #0/#10.

Meanwhile, in case of a DL synchronization signal transmitted on UL CC, it may not use the DL synchronization signal for cell search. Hence, i) it may transmit a pair of a PSS signal and an SSS signal only, ii) it may transmit a PSS signal only, or iii) it may transmit an SSS signal only in a radio frame.

As a different method, a UE may operate under assumption that i) UL CC and DL CC are synchronized in DL only when a UE fails to detect actual-cfg and performs fallback using UL-only-cfg (e.g., DL signal reception operation on UL CC is performed in accordance with DL timing sync of DL CC), or ii) UL CC and DL CC are synchronized in DL all the time in a state that PSS/SSS transmission is omitted on UL CC (e.g., DL CC corresponds to a sync reference carrier that always provides at least DL timing sync information of UL CC).

Meanwhile, in case of a CSI-RS, a DMRS, and an EPDCCH signal in D which is reconfigured on UL CC i) the signals can be configured/transmitted based on a structure applied to TDD in accordance with SF reconfiguration based on 8 ms-UD-cfg, or ii) the signals can be configured/transmitted based on a structure applied to TDD in a part of specific D including a special SF (and/or PSS/SSS) and the signal can be configured/transmitted based on a structure applied to FDD in response to the remaining Ds.

PDSCH HARQ Timing for DL CC (i.e. D-Ref-DC)

In case of DL HARQ timing for PDSCH on DL CC, i.e., D-ref-DC, it may be able to apply a DASI parameter shown in Table 17 according to 8 ms-UD-cfg configured by the D-ref-UC.

Meanwhile, the DCI format-related field configuration and corresponding signaling can be restrictively applied to a DCI format set to USS only (hereinafter, USS DCI format). In case of a DCI format set to CSS (hereinafter, CSS DCI format), it may be able to maintain field configuration of the CSS DCI format of a legacy FDD as it is to prevent an error due to discordance/ambiguity between a UE and an eNB in RRC reconfiguration section (e.g., No DL DAI field, 3-bit HARQ-num field). Since the DL DAI field exists at the USS DCI format only, it may be able to define/configure HARQ-ACK response for PDSCH, which is scheduled by the CSS DCI format, to be fixed on a specific position in ACK/NACK payload (for PF3) or ACK/NACK state (for CHsel). The specific position can be defined by a position corresponding to a first/last DL DAI value coupled with DL CC or a position corresponding to a first/last HARQ-ACK response. And, since a size of HARQ-num field of the CSS-DCI format is smaller than a size of HARQ-num field of the USS DCI format, it may be able to define/configure a HARQ-num field value, which is signaled via the CSS DCI format, to correspond to a specific number among the total HARQ process numbers (e.g., 8 numbers from a minimum value (e.g., 1~8)).

And, a UE may operate under an assumption that CSS-based scheduling is restricted to be performed maximum one time only in a TDD bundling window corresponding to one HARQ-ACK transmission timing and/or the CSS-based scheduling is performed via D1 with legacy timing only. For example, the UE monitors the CSS and the USS at D1 with legacy timing and monitors the USS only at the other DL SF (D1 with non-legacy timing, D2).

PUSCH HARQ Timing for UL CC (i.e. U-Ref-UC)

In case of UL HARQ timing (U-ref-UC) for PUSCH on UL CC, i) it may be able to apply original FDD timing (e.g., PUSCH-to-PUSCH=8 ms, UL grant and/or PHICH-to-PUSCH=4 ms, PUSCH-to-PHICH and/or UL grant=4 ms) as it is, or ii) it may be able to configure the UL HARQ timing by at least one of specific UD-cfgs (e.g., actual-cfg 3-1/2/3/4 or 4-1/2/3 that the number of Us within 8 ms-period is configured by 3 or 4) including relatively more UL resources in advance or via higher layer signaling such as RRC and the like.

Meanwhile, it may be able to additionally configure a UL DAI field to a UL grant DCI format that schedules PUSCH on UL CC. A UL DAI value can be indicated by the UL DAI field. In case of an aperiodic CSI request field in the UL grant DCI format, i) the aperiodic CSI request field can be

TABLE 17

| UL/DL ratio | SF order | 0 | 1 | 2 | 3 | 4 | 5 | 6 | 7 |
|---|---|---|---|---|---|---|---|---|---|
| 1 UL per 8 ms | actual-cfg 1-1 | 4/5/6/7/8/9/10/11 | — | | — | — | — | — | — |
| 2 ULs per 8 ms | actual-cfg 2-1 | 4/6/8/10 | 4/6/8/10 | — | — | — | — | — | — |
| | actual-cfg 2-2 | 4/5/6/7 | — | | — | 4/5/6/7 | — | — | — |

Meanwhile it may be able to additionally configure a DL DAI field to a DL grant DCI format for scheduling PDSCH on DL CC and a DL DAI value can be indicated by the DL DAI field. And, a size of a HARQ-num field of the DL grant DCI format can also be extensively configured in a manner of being identical to the TDD case (e.g., 4 bits). And, it may be able to additionally configure an aperiodic SRS request field in a specific DL grant DCI format (e.g., DCI format 2B/2C/2D) that schedules PDSCH on UL CC. In this case, an eNB can indicate a UE to perform SRS transmission via the aperiodic SRS request field.

configured to always report CSI to both DL CC and UL CC while 1-bit is maintained, or ii) the aperiodic CSI request field can be configured to report CSI to DL CC and/or UL CC in a manner of being configured by 2 bits (e.g., each bit is used for independent CSI request according to DL/UL CC). For example, a first bit of the CSI request field is used for requesting CSI on DL CC and a second bit of the CSI request field is used for requesting CSI on UL CC (or, DL/UL CC).

Meanwhile, the UL grant DCI format-related field configuration and corresponding signaling can be restrictively applied to a USS DCI format only. In case of a DCI format set to CSS, it may be able to maintain a DCI format field configuration, which is set to CSS in legacy FDD, as it is to prevent an error due to discordance/ambiguity between a UE and an eNB in RRC reconfiguration section (e.g., No UL DAI field, 1-bit aperiodic CSI request field). In consideration of this, it may be able to define/configure CSI report to be reported on a specific CC (e.g., DL CC) only via the CSS DCI format.

Meanwhile, if UL CC does not permit any configuration scheduled by the UL CC itself (Case #1), it may not configure no PHICH resource to D (i.e., D2) which is reconfigured on the UL CC. On the contrary, if the UL CC permits a configuration scheduled by the UL CC itself (Case #2), it may be able to configure a PHICH resource to all D2s. In addition, in order to allocate/map a PHICH (and a different control channel including PDCCH) resource to the D2, i) it may be able to independently configure a separate PHICH-Config parameter (e.g., phich-Duration (normal or extended) and/or phich-Resource (1/6, 1/2, 1, or 2), or ii) it may be able to use PHICH-Config parameter applied to DL CC as it is.

Meanwhile, in case of the Case #1, it may not configure/transmit PCFICH and/or PDCCH to the D which is reconfigured on the UL CC. On the contrary, in case of the Case #2, it may be able to configure/transmit PCFICH and/or PDCCH to the D which is reconfigured on the UL CC.

And, a UE may operate under an assumption that CSS-based scheduling is restricted to be performed maximum one time only in a TDD bundling window corresponding to one HARQ-ACK transmission timing and/or the CSS-based scheduling is performed via D1 with legacy timing only. For example, the UE monitors the CSS and the USS at D1 with legacy timing and monitors the USS only at the other DL SF (D1 with non-legacy timing, D2).

Fallback Operation in Case of Missing Actual-Cfg

Actual-cfg for dynamic SF reconfiguration on UL CC can be signaled with a prescribed period. In this case, if a UE fails to detect the actual-cfg, the UE may operate under an assumption that a predetermined default UD-cfg corresponds to the actual-cfg (i.e., fallback operation). In this case, the default UD-cfg can be configured by the UL-only-cfg or U-ref-UC and all HARQ timing coupled with PDSCH/PUSCH scheduling of DL/UL CC can be maintained as it is (e.g., D-ref-UC, D-ref-DC, and U-ref-UC are applied as it is). In this case, UL channel/signal transmission transmitted on UL CC can be restricted to be performed via an SF corresponding to U on the U-ref-UC or an SF corresponding to U on the D-ref-UC only.

Configuration Periodicity for Signaling on UL CC

In FDD situation, if eIMTA is performed based on the 8 ms-UD-cfg, an SF configuration on UL CC is repeated with a period of 8 ms. On the contrary, since a period between various legacy UL/DL signaling and available timing (e.g., CSI reporting, SR transmission, SPS PUSCH transmission, SRS transmission, PRACH transmission available timing, CSI-RS transmission, etc.) is configured in a unit of 10 ms, an SF configuration period and a signaling period may not be aligned with each other.

In consideration of this, a UL signaling (available timing) period on UL CC can be configured as follows. i) UL signaling transmission is omitted/abandoned only when a signaling target SF corresponds to D (or S) on the actual-cfg while the period is maintained by the original period 10 ms. Or, ii) the period can be configured by 40 ms or a multiple of 40 ms in accordance with 8 ms-UD-cfg-based SF reconfiguration. In case of the i), it is appropriate for CSI reporting and/or SRS transmission. In case of the ii), it is appropriate for SR transmission and/or SPS PUSCH transmission and/or PRACH transmission.

Similarly, a DL signaling (e.g., CSI-RS transmission) period on UL CC can be configured as follows. i) DL signaling transmission/reception is omitted only when a signaling target SF corresponds to U (or S) on the actual-cfg while the period is maintained by the original period 10 ms. Or, ii) the period can be configured by 40 ms or a multiple of 40 ms in accordance with 8 ms-UD-cfg-based SF reconfiguration.

PUCCH Resource Allocation for HARQ-ACK Feedback

D (in DL CC and/or UL CC) that HARQ-ACK timing is linked to U (in UL CC) on the D-ref-UC in the aspect of PUCCH resource allocation can be classified into three types including 1) D1 with legacy timing, 2) D1 with non-legacy timing, and 3) D2 (with legacy timing and/or non-legacy timing) according to a combination of the D-ref-UC and the D-ref-DC. A timing offset (e.g., 4 ms or 4 SFs) relationship between PDCCH/PDSCH transmission on DL CC and HARQ-ACK transmission on UL CC in a legacy FDD system is defined as legacy timing.

To this end, it may consider a PUCCH resource allocation method described in the following.

Method 1) PUCCH Resource Allocation by Implicit Resource Stacking

A PUCCH resource linked at D1 with non-legacy timing and D2 is implicitly stacked after a legacy (FDD) implicit PUCCH resource region linked at D1 with legacy timing. In particular, an implicit PUCCH resource, which is linked to D, can be stacked in an order of D1 with legacy timing->D1 with non-legacy timing/D2 from the outside to the inside of a frequency band of UL CC. As an example, if a last (legacy) implicit PUCCH resource index linked at D1 with legacy timing is defined as N_last, a PUCCH index, which is resulted from adding a value of the index N_last to a PUCCH index linked to a CCE index configured at D1 with non-legacy timing and D2, can be determined as a last implicit PUCCH resource linked at the D1 with non-legacy timing and the D2. In this case, a legacy implicit PUCCH resource region (e.g., N_last) linked at D1 with legacy timing can be configured in a manner of assuming a maximum CFI value (or maximum number of CCE resources) capable of being configured at the D1 with legacy timing. Similarly, an implicit PUCCH resource region linked at D1 with non-legacy timing and D2 can also be configured in a manner of assuming a maximum CFI value (or maximum number of CCE resources) capable of being configured at corresponding D. A legacy implicit PUCCH resource index is determined by equation 3.

Method 2) PUCCH Resource Allocation with PUCCH Starting Offset

In case of D1 with legacy timing, a legacy implicit PUCCH resource linked at corresponding D is allocated as it is. In case of D1 with non-legacy timing and D2, a final implicit PUCCH resource linked at the D1 with non-legacy timing and the D2 can be determined or allocated by applying a PUCCH resource starting offset to a PUCCH index linked to a CCE index at the D.

Specifically, if the PUCCH resource starting offset is defined as N_pucch, a PUCCH index, which is resulted from adding a value of the N_pucch offset to a PUCCH index linked to a CCE resource index configured at D1 with non-legacy timing and D2, can be determined or allocated as a final implicit PUCCH resource linked at the D1 with non-legacy timing and the D2. In this case, the value of the N_pucch offset can be UE-commonly or UE-specifically configured via higher layer signaling (e.g., RRC). And, one N_pucch value can be commonly set to the D1 with non-legacy timing and the D2. Or, an independent N_pucch value can be set to the D1 with non-legacy timing and the D2, respectively.

And, the Method 1 and the Method 2 can be applied to the D1 with non-legacy timing and the D2, respectively.

Meanwhile, in the Method 1 and the Method 2, in order to stack a PUCCH resource linked at the D1 with non-legacy timing and the D2, it may consider methods described in the following.

Alt 1: A PUCCH resource linked at the D2 is stacked after a PUCCH resource linked at the D1 with non-legacy timing is stacked (i.e., an implicit PUCCH resource, which is linked to D2, is stacked in an order of D1 with non-legacy timing->D2 from the outside to the inside of a frequency band of UL CC).

Alt 2: A PUCCH resource linked at D is stacked in an SF order or an SF order on DL association set index (i.e., DASI) of D-ref-DC/D-ref-UC (i.e., a PUCCH resource is sequentially stacked from D of which an SF order is faster from the outside to the inside of a frequency band of UL CC). In this case, a PUCCH resource can be stacked in an order of D1 with non-legacy timing->D2 in an SF.

Method 3) PUCCH Resource Allocation with Explicit RRC Resource

In case of the D1 with legacy timing and the D1 with non-legacy timing, (implicit) PUCCH resource is allocated by applying the Method 1 and the Method 2. In case of the D2, it may be able to allocate an explicit PUCCH resource configured via higher layer signaling (e.g., RRC).

As an example, when a plurality of explicit PUCCH resources (sets) capable of being allocated in response to D2 are configured in advance, it may be able to indicate a PUCCH resource (set) to be finally allocated/used to transmit corresponding HARQ-ACK among a plurality of the PUCCH resources (set) via L1 signaling. Specifically, a final PUCCH resource can be indicated by a specific DL grant DCI (e.g., DG DCI for scheduling the D2). To this end, it may be able to add a new field to the DCI or borrow/refer to a legacy specific field (e.g., TPC field) in the DCI to indicate the PUCCH resource. And, a final PUCCH resource can be indicated based on a resource in which the DCI is transmitted (e.g., a minimum/maximum CCE index used for transmitting PDCCH). Or, a final PUCCH resource can be indicated based on a resource used for transmitting PDSCH scheduled by the DCI (e.g., a minimum/maximum PRB index used for transmitting the PDSCH).

HARQ-ACK Feedback Composition with PF3 and CHsel

First of all, a legacy HARQ-ACK configuration/transmission method applied to TDD-based CA is summarized in the following. In this case, the HARQ-ACK configuration/ transmission method includes a method of configuring/ transmitting HARQ-ACK based on PUCCH format 3 (hereinafter, PF3) or PUCCH format 1b with channel selection (hereinafter, CHsel).

1) PF3 for TDD
A. TPC/ARI signaling
  i. DL grant PDCCH of which DAI is set to 1 and scheduling Pcell: TPC for controlling PUCCH transmit power is signaled
  ii. DL grant PDCCH of which DAI is greater than 1 and scheduling Pcell or scheduling Scell: ARI for indicating one of a plurality of PF3 resources is signaled
B. HARQ-ACK resource
  i. PDCCH of which DAI corresponds to 1 and scheduling Pcell is received only: HARQ-ACK is transmitted using implicit PUCCH format 1a/1b linked to the PDCCH
  ii. PDCCH of which DAI is greater than 1 and scheduling Pcell or scheduling Scell is received: HARQ-ACK is transmitted using PF3 resource indicated by ARI in the PDCCH
C. HARQ-ACK ordering
  i. A HARQ-ACK bit on PF3 payload is configured in an order of Pcell->Scell between cells and the HARQ-ACK bit is configured in an order of a DAI value in each cell. For example, a HARQ-ACK response is arranged at MSB (most significant bit) in response to DAI=1 of Pcell and the HARQ-ACK response sequentially is arranged in an order of DAI=2 of next Pcell, DAI=1 of Scell.

2) CHsel for TDD
A. TPC/ARI signaling
  i. With cross-CC scheduling
    1. DL grant PDCCH scheduling Pcell: TPC for controlling PUCCH transmit power is signaled
    2. DL grant PDCCH scheduling Scell: both TPC and ARI are not signaled (UE does not refer to TPC field)
  ii. Without cross-CC scheduling
    1. DL grant PDCCH scheduling Pcell: TPC for controlling PUCCH transmit power is signaled
    2. DL grant PDCCH scheduling Scell: ARI indicating one of a plurality of explicit PF1 resources (sets) allocated via RRC is signaled
B. HARQ-ACK resource
  i. With cross-CC scheduling
    1. PUCCH resource corresponding to Pcell: Implicit PF1 resource linked to PDCCH of which DAI=1/2 and scheduling Pcell
    2. PUCCH resource corresponding to Scell: Implicit PF1 resource linked to PDCCH of which DAI=1/2 and scheduling Scell
  ii. Without cross-CC scheduling
    1. PUCCH resource corresponding to Pcell: Implicit PF1 resource linked to PDCCH of which DAI=1/2 and scheduling Pcell
    2. PUCCH resource corresponding to Scell: Explicit PF1 resource (set) indicated by ARI in PDCCH scheduling Scell
C. HARQ-ACK ordering
  i. HARQ-ACK responses corresponding to DAI=1, 2, 3 and 4 of Pcell are sequentially mapped to HARQ-ACK (0), (1), (2), and (3) corresponding to Pcell and HARQ-ACK responses corresponding to DAI=1, 2, 3 and 4 of Scell are sequentially mapped to HARQ-ACK (0), (1), (2), and (3) corresponding to Scell on A/N state-to-PUCCH resource mapping table for CHsel.

In case of FDD eIMTA, HARQ-ACK configuration/ transmission method, which is applied to Pcell-Scell TDD CA, can be similarly applied in a state that DL CC is considered as Pcell and UL CC is considered as Scell. Specifically, it may be able to perform HARQ-ACK configuration/transmission for FDD eIMTA (e.g., TPC/ARI signaling, HARQ-ACK resource allocation, HARQ-ACK ordering, etc.) by replacing/considering the Pcell and the Scell with/as D1 and D2, respectively. In this case, "with cross-CC scheduling" can be applied to a situation that the D2 is configured to be scheduled by the D1 in a state that a PUCCH resource is allocated based on the method 1 or the method 2 or a PUCCH resource is allocated based on the method 3. And, "without cross-CC scheduling" can be applied to a situation that the D2 is configured to be scheduled by the D2 itself in a state that a PUCCH resource is allocated based on the method 3.

Meanwhile, in case of PF3, when PDCCH corresponding to a CSS DL grant DCI format is received only while Pcell is scheduled, HARQ-ACK can be transmitted using an implicit PUCCH format 1a/1b resource linked to the PDCCH. In case of other cases (e.g., receiving a USS DG DCI format, receiving a plurality of PDCCHs), a UE can perform HARQ-ACK transmission using an explicitly indicated PF3 resource. In case of PDCCH corresponding to a DL grant DCI format, which is set to CSS and scheduling Pcell, a TPC for controlling PUCCH transmit power can be signaled via the PDCCH.

In addition, (in the aspect of a UE), the UE may operate under an assumption that CSS-based scheduling is restricted to be performed maximum one time only in a TDD bundling window corresponding to one HARQ-ACK transmission timing and/or the CSS-based scheduling is performed via D1 with legacy timing only. For example, the UE monitors the CSS and the USS at D1 with legacy timing and monitors the USS only at the other DL SF.

When a PF3 is set, if CSS-based Pcell (=D1=DL CC) scheduling, DAI=1-based Pcell (=D1=DL CC) scheduling and/or SPS-based scheduling not accompanied with PDCCH transmission are received at the same time, HARQ-ACK feedback corresponding to the scheduling can be configured/transmitted by applying CHsel scheme based on (a plurality of) PUCCH format 1a/1b resource linked/allocated to each scheduling.

HARQ-ACK Feedback by SF-Based PF3/CHsel (w/o DAI)

As a different method of configuring and transmitting HARQ-ACK feedback, the present invention proposes a scheme of applying PF3 and CHsel based on a DASI shown in FIGS. 16 to 17 (without DAI signaling/reference). The proposed HARQ-ACK feedback scheme can be applied not only to FDD eIMTA but also to a random DL scheduling situation scheduled based on a random DASI configuration (including a DASI defined by a legacy TDD UL/DL configuration). For clarity, among a plurality of DASIs linked to one HARQ-ACK transmission timing, an SF (e.g., a latest SF in time) corresponding to a lowest DASI including a lowest value is defined as "Last SF" and an SF set corresponding to the remained DASI set except the lowest DASI is defined as "First part".

When the PF3 is applied, if DL data is received via the Last SF only, it may be able to transmit A/N corresponding to the DL data in the Last SF using an implicit PF1 resource linked to a DG PDCCH, which has scheduled the DL data. On the contrary, if DL data is received via the First part, it may be able to transmit A/N feedback in response to all SF sets (i.e., including both the First part and the Last SF) using a PF3 resource indicated by a DG PDCCH, which has scheduled the DL data. Bits of the A/N can be arranged according to an SF (or DASI) order (e.g., A/N bit corresponding to earlier or later SF (or DASI) is arranged to MSB). And, a TPC command for controlling PUCCH power is signaled to a DG PDCCH scheduling the Last SF and ARI for indicating a PF3 resource can be signaled to a DG PDCCH scheduling the First part.

When the CHsel is applied, it may be able to allocate an implicit PF1 resource linked to a DG PDCCH scheduling the Last SF as a PUCCH resource corresponding to the Last SF and it may be able to allocate an implicit PF1 resource (stacked) via application of the Method 1/2/3 or an explicit PF1 resource occupied by RRC signaling as a PUCCH resource corresponding to the First part. Each A/N response (e.g., HARQ-ACK(i)) among the total A/N states may follow an SF (or DASI) order. For example, an A/N response corresponding to earlier or later SF (or DASI) can be arranged to MSB (e.g., HARQ-ACK(0)). And, a TPC command for controlling PUCCH power is signaled to a DG PDCCH scheduling the Last SF and ARI for indicating an explicit PF1 resource can be signaled to a DG PDCCH scheduling the First part.

Meanwhile, in case of DASI corresponding to DL CC, the aforementioned proposed method is applied to the Last SF and the First part, respectively. On the contrary, in case of DASI corresponding to UL CC, an operation corresponding/applied to the First part (e.g., PUCCH resource allocation, TPC and ARI signaling, etc.) can be identically applied to both the Last SF and the First part.

The present invention can be extensively applied not only to FDD eIMTA scheme based on 8 ms-UD-cfg but also to all FDD eIMTA schemes that a UC CC resource is reconfigured by a random UL/DL SF configuration (e.g., legacy TDD UD-cfg having a period of 10 ms).

Figure 18:
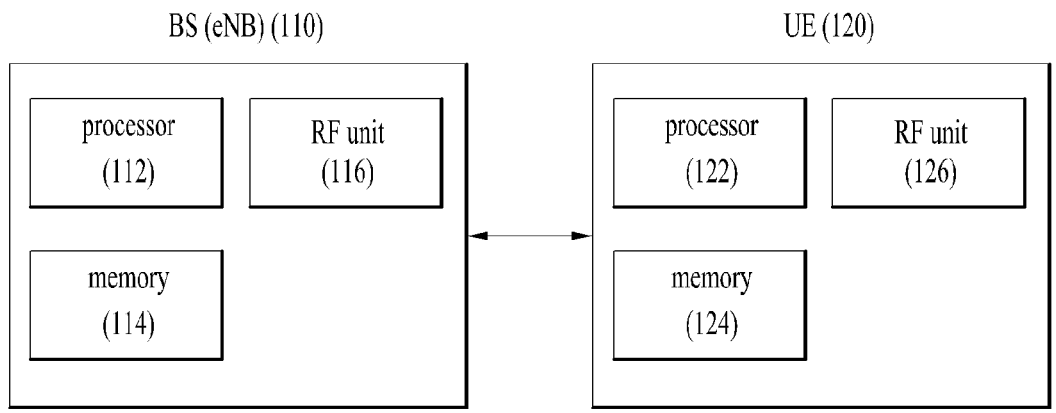
FIG. 18 illustrates a base station and a user equipment applicable to an embodiment of the present invention.

FIG. 18 illustrates a BS and a UE of a wireless communication system, which are applicable to embodiments of the present invention. When the wireless communication system includes a relay, the BS or UE can be replaced by the relay.

Referring to FIG. 18, the wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a UE, BS or other apparatuses (e.g. a relay) of a wireless communication apparatus. Specifically, the present invention is applicable to a method for transmitting control information and an apparatus for the same.

What is claimed is:

1. A method of transmitting control information, by a user equipment in a wireless communication system via a frequency division duplex (FDD) cell containing an uplink component carrier (UL CC) and a downlink component carrier (DL CC), the method comprising:
receiving subframe reconfiguration information on the UL CC,
wherein the UL CC includes only UL subframes,
wherein the subframe reconfiguration information indicates a subframe pattern including at least one UL subframe, DL subframe and special subframe,
wherein the subframe pattern is repeated in a unit of 8 subframes;
reconfiguring the UL subframes of the UL CC based on the subframe pattern;
receiving a physical downlink control channel (PDCCH) containing downlink control information (DCI) on the FDD cell;
receiving a physical downlink shared channel (PDSCH) indicated by the PDCCH on the FDD cell; and
transmitting hybrid automatic repeat request acknowledgement (HARQ-ACK) information on the UL CC in response to the PDSCH,
wherein when the PDSCH is received on the DL subframe of the DL CC, the DCI does not comprise a DAI (downlink assignment index) field,
wherein when the PDSCH is received on the DL subframe or the special subframe of the UL CC included in reconfigured subframes of the UL CC, the DCI comprises the DAI field, and
wherein the DAI field indicates a counting value of the PDCCH related to the PDSCH received on the DL subframe or the special subframe of the UL CC included in reconfigured subframes of the UL CC.

2. The method of claim 1,
wherein when the PDSCH is received on the DL CC, the DCI comprises a 3-bit HARQ process number field, and
wherein when the PDSCH is received on the DL subframe or the special subframe of the UL CC included in reconfigured subframes of the UL CC, the DCI comprises a 4-bit HARQ process number field.

3. The method of claim 1,
wherein when the PDSCH is received on the DL CC, the DCI is received via a common search space (CSS) or a UE-specific SS (USS), and
wherein when the PDSCH is received on the DL subframe or the special subframe of the UL CC included in reconfigured subframes of the UL CC, the DCI is received via only the USS.

4. The method of claim 1,
wherein the subframe reconfiguration information on the UL CC indicates UL-DL configuration, and
wherein subframe configuration of the UL CC is assigned as follows according to the UL-DL configuration.

| UL-DL configuration | Subframe number | | | | | | | |
|---|---|---|---|---|---|---|---|---|
| | 0 | 1 | 2 | 3 | 4 | 5 | 6 | 7 |
| 1-1 | U | D | D | D | D | D | D | S |
| 2-1 | U | U | D | D | D | D | D | S |
| 2-2 | U | D | D | S | U | D | D | S |
| 3-1 | U | U | U | D | D | D | D | S |
| 3-2 | U | D | S | U | D | S | U | S |
| 3-3 | U | U | D | S | U | D | D | S |
| 3-4 | U | U | D | D | S | U | D | S |
| 4-1 | U | U | U | U | D | D | D | S |
| 4-2 | U | S | U | S | U | S | U | S |
| 4-3 | U | U | D | S | U | U | D | S. |

5. The method of claim 4,
wherein when the PDSCH is received on the DL subframe or the special subframe of the UL CC included in reconfigured subframes of the UL CC, a timing relationship between the PDSCH and the HARQ-ACK follows a timing relationship of UL-DL configuration #1-1, #2-1, or #2-2, and
wherein a timing relationship according to the UL-DL configuration is given as follows:

| UL-DL configuration | Subframe number | | | | | | | |
|---|---|---|---|---|---|---|---|---|
| | 0 | 1 | 2 | 3 | 4 | 5 | 6 | 7 |
| 1-1 | 4/5/6/7/9/10/11 | — | — | — | — | — | — | — |
| 2-1 | 4/6/10 | 4/6/10 | — | — | — | — | — | — |
| 2-2 | 5/6/7 | — | — | — | 5/6/7 | — | — | — | wherein subframe n corresponds to an subframe transmitting the HARQ-ACK information, subframe n−k corresponds to an subframe receiving the PDSCH, and k and n correspond to values belonging to the table.

6. A user equipment (UE) configured to transmit control information via a frequency division duplex (FDD) cell containing a uplink component carrier (UL CC) and a downlink component carrier (DL CC) in a wireless communication system, the UE comprising:
  transmitter and receiver; and
  a processor, operatively coupled to the transmitter and receiver, wherein the processor is configured to:
  control the receiver to receive subframe reconfiguration information on the UL CC,
  wherein the UL CC includes only UL subframes,
  wherein the subframe reconfiguration information indicates a subframe pattern including at least one UL subframe, DL subframe and special subframe,
  wherein the subframe pattern is repeated in a unit of 8 subframes;
  reconfigure the UL subframes of the UL CC based on the subframe pattern;
  control the receiver to receive a physical downlink control channel (PDCCH) containing downlink control information (DCI) on the FDD cell;
  control the receiver to receive a physical downlink shared channel (PDSCH) indicated by the PDCCH on the FDD cell; and
  control the transmitter to transmit hybrid automatic repeat request acknowledgement (HARQ-ACK) information on the UL CC in response to the PDSCH,
  wherein when the PDSCH is received on the DL subframe of the DL CC, the DCI does not comprise a DAI (downlink assignment index) field,
  wherein when the PDSCH is received on subframe or the special subframe of the UL CC included in reconfigured subframes of the UL CC, the DCI comprises the DAI field, and
  wherein the DAI field indicates a counting value of the PDCCH related to the PDSCH received on the DL subframe or the special subframe of the UL CC included in reconfigured subframes of the UL CC.

7. The UE of claim 6,
  wherein when the PDSCH is received on the DL CC, the DCI comprises a 3-bit HARQ process number field, and
  wherein when the PDSCH is received on the DL subframe or the special subframe of the UL CC included in reconfigured subframes of the UL CC, the DCI comprises a 4-bit HARQ process number field.

8. The UE of claim 6,
  wherein when the PDSCH is received on the DL CC, the DCI is received via a common search space (CSS) or a UE-specific SS (USS), and
  wherein when the PDSCH is received on the DL subframe or the special subframe of the UL CC included in reconfigured subframes of the UL CC, the DCI is received via only the USS.

9. The UE of claim 6,
  wherein the subframe reconfiguration information on the UL CC indicates time division duplex (TDD) UL-DL configuration, and
  wherein subframe configuration of the UL CC is assigned as follows according to the TDD UL-DL configuration.

| UL-DL configuration | Subframe number | | | | | | | |
|---|---|---|---|---|---|---|---|---|
| | 0 | 1 | 2 | 3 | 4 | 5 | 6 | 7 |
| 1-1 | U | D | D | D | D | D | D | S |
| 2-1 | U | U | D | D | D | D | D | S |
| 2-2 | U | D | D | S | U | D | D | S |
| 3-1 | U | U | U | D | D | D | D | S |
| 3-2 | U | D | S | U | D | S | U | S |
| 3-3 | U | U | D | S | U | D | D | S |
| 3-4 | U | U | D | D | S | U | D | S |
| 4-1 | U | U | U | U | D | D | D | S |
| 4-2 | U | S | U | S | U | S | U | S |
| 4-3 | U | U | D | S | U | U | D | S. |

10. The UE of claim 9,
  wherein when the PDSCH is received on the DL subframe or the special subframe of the UL CC included in reconfigured subframes of the UL CC, a timing relationship between the PDSCH and the HARQ-ACK follows a timing relationship of UL-DL configuration #1-1, #2-1, or #2-2, and
  wherein a timing relationship according to the UL-DL configuration is given as follows:

| UL-DL configuration | Subframe number | | | | | | | |
|---|---|---|---|---|---|---|---|---|
| | 0 | 1 | 2 | 3 | 4 | 5 | 6 | 7 |
| 1-1 | 4/5/6/7/9/10/11 | — | — | — | — | — | — | — |
| 2-1 | 4/6/10 | 4/6/10 | — | — | — | — | — | — |
| 2-2 | 5/6/7 | — | — | — | 5/6/7 | — | — | — | wherein subframe n corresponds to an subframe transmitting the HARQ-ACK information, subframe n−k corresponds to an subframe receiving the PDSCH, and k and n correspond to values belonging to the table.

* * * * *